United States Patent
Davidson

(10) Patent No.: US 12,011,903 B2
(45) Date of Patent: Jun. 18, 2024

(54) LAMINATED GLAZING PANEL

(71) Applicant: PILKINGTON GROUP LIMITED, Lathom (GB)

(72) Inventor: Michael John Davidson, Warrington (GB)

(73) Assignee: Pilkington Group Limited, Lathom (GB)

( * ) Notice: Subject to any disclaimer, the term of this patent is extended or adjusted under 35 U.S.C. 154(b) by 0 days.

(21) Appl. No.: 17/794,657

(22) PCT Filed: Jan. 27, 2021

(86) PCT No.: PCT/GB2021/050187
§ 371 (c)(1),
(2) Date: Jul. 22, 2022

(87) PCT Pub. No.: WO2021/152304
PCT Pub. Date: Aug. 5, 2021

(65) Prior Publication Data
US 2023/0073394 A1    Mar. 9, 2023

(30) Foreign Application Priority Data

Jan. 27, 2020  (GB) .................................... 2001116

(51) Int. Cl.
*B32B 3/24*  (2006.01)
*B32B 3/06*  (2006.01)
(Continued)

(52) U.S. Cl.
CPC .......... *B32B 17/10036* (2013.01); *B32B 3/06* (2013.01); *B32B 3/08* (2013.01);
(Continued)

(58) Field of Classification Search
CPC ........................... B32B 17/10036; B32B 3/06
See application file for complete search history.

(56) References Cited

U.S. PATENT DOCUMENTS 4,793,112 A     12/1988  Sufke
2005/0188634 A1  9/2005  Bolton et al.
2006/0005482 A1  1/2006  Bennison et al.

FOREIGN PATENT DOCUMENTS

WO    WO 96/22443 A1      7/1996
WO    WO 2006/121440 A1  11/2006

OTHER PUBLICATIONS

UK Intellectual Property Office, GB Search Report; issued in GB2001116.9, Jul. 21, 2020, 1 page, UK Intellectual Property Office, Newport, South Wales.
(Continued)

*Primary Examiner* — William P Watkins, III
(74) *Attorney, Agent, or Firm* — Marshall & Melhorn, LLC

(57) ABSTRACT

A laminated glazing panel comprising first and second sheets of glazing material joined by an interlayer structure comprising a first sheet of adhesive interlayer material is described. Inboard of a peripheral edge of the first sheet of glazing material, the first sheet of glazing material has a hole therein. The laminated glazing panel further comprises a glazing fitting secured thereto, the glazing fitting comprising a head portion and an attachment feature. The head portion is positioned in the hole such that a first surface thereof faces the first sheet of adhesive interlayer material. Some of the first sheet of adhesive interlayer material is in the hole and is operatively associated with the first attachment feature thereby attaching the glazing fitting to the first sheet of adhesive interlayer material. Suitable glazing fittings and methods of making such laminated glazing panels are also described.

20 Claims, 9 Drawing Sheets

(51) Int. Cl.
*B32B 3/08* (2006.01)
*B32B 3/26* (2006.01)
*B32B 7/12* (2006.01)
*B32B 17/10* (2006.01)
*B32B 27/30* (2006.01)
*B32B 27/32* (2006.01)
*B32B 27/36* (2006.01)
*B32B 27/40* (2006.01)

(52) U.S. Cl.
CPC ................ *B32B 3/266* (2013.01); *B32B 7/12* (2013.01); *B32B 17/10752* (2013.01); *B32B 17/1077* (2013.01); *B32B 17/10788* (2013.01); *B32B 27/30* (2013.01); *B32B 27/304* (2013.01); *B32B 27/306* (2013.01); *B32B 27/32* (2013.01); *B32B 27/365* (2013.01); *B32B 27/40* (2013.01); *B32B 2270/00* (2013.01); *B32B 2419/00* (2013.01)

(56) References Cited

OTHER PUBLICATIONS

European Patent Office, International Search Report with Written Opinion, issued in PCT/GB2021/050187, Apr. 20, 2021, 13 pages, European Patent Office, Rijswijk, Netherlands.

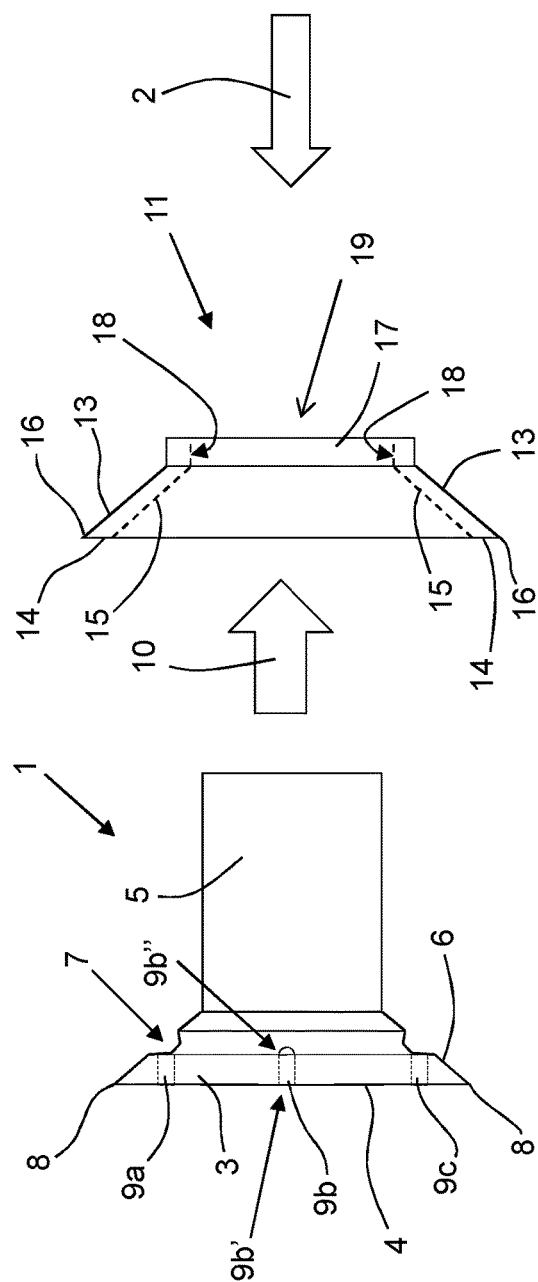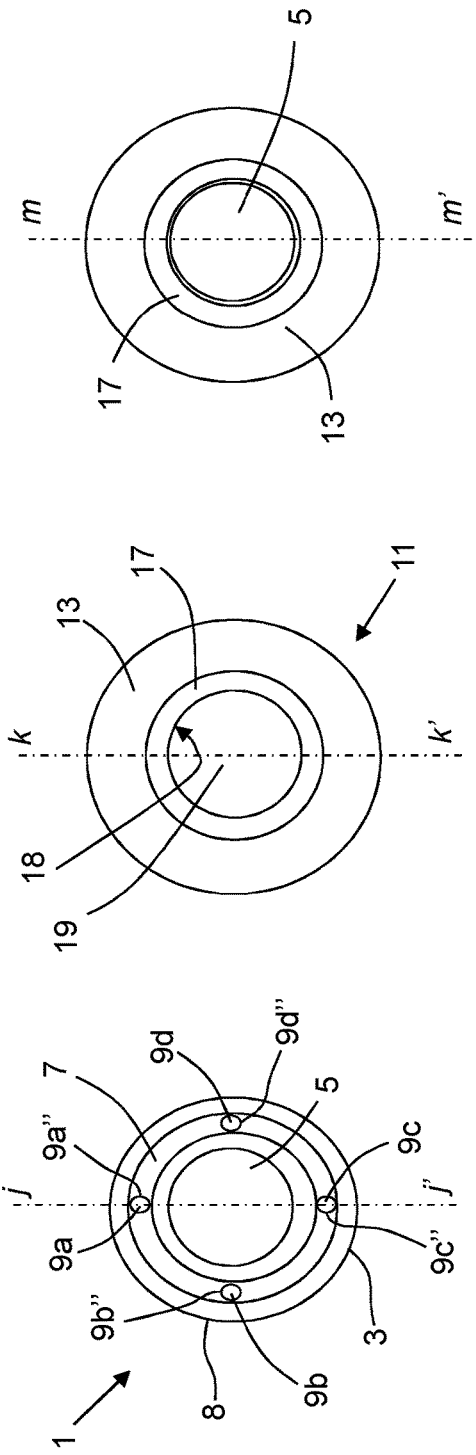

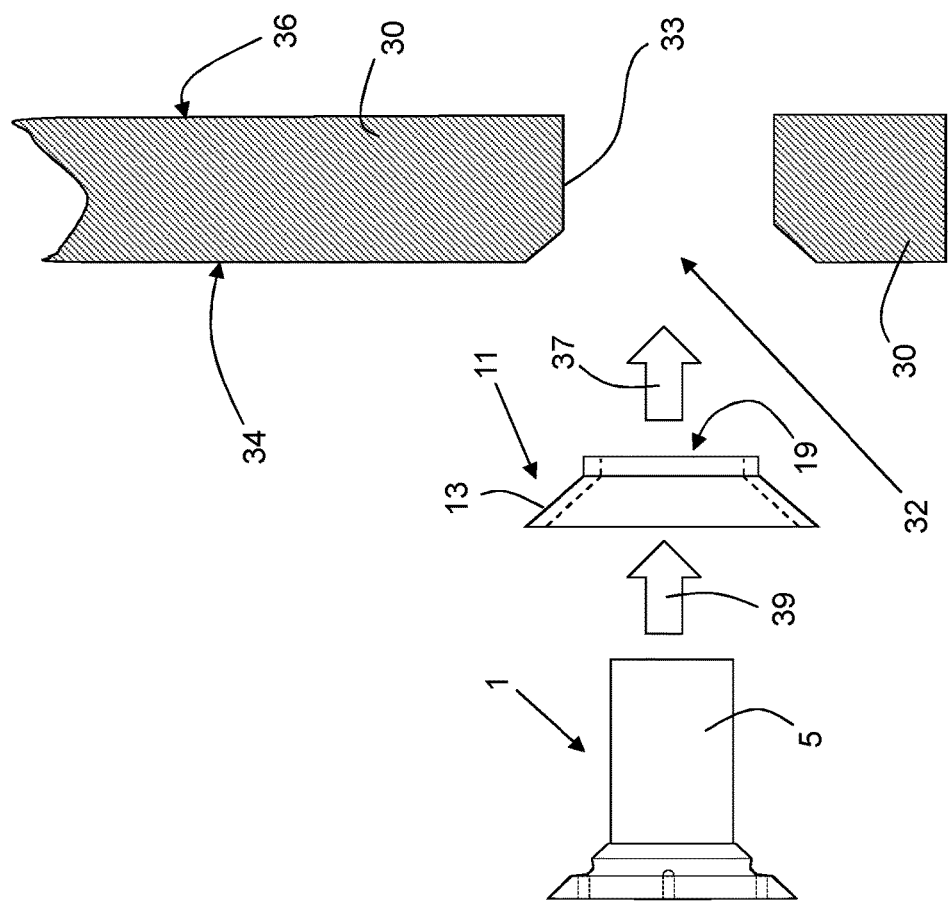
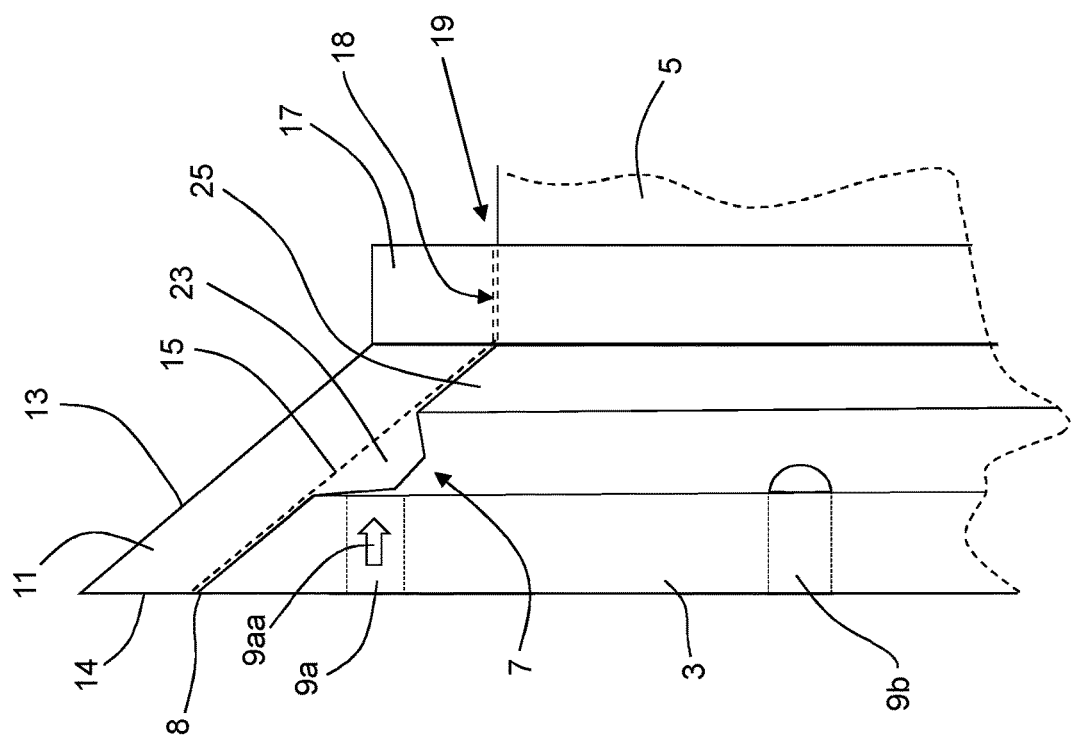
Fig. 6
Fig. 5

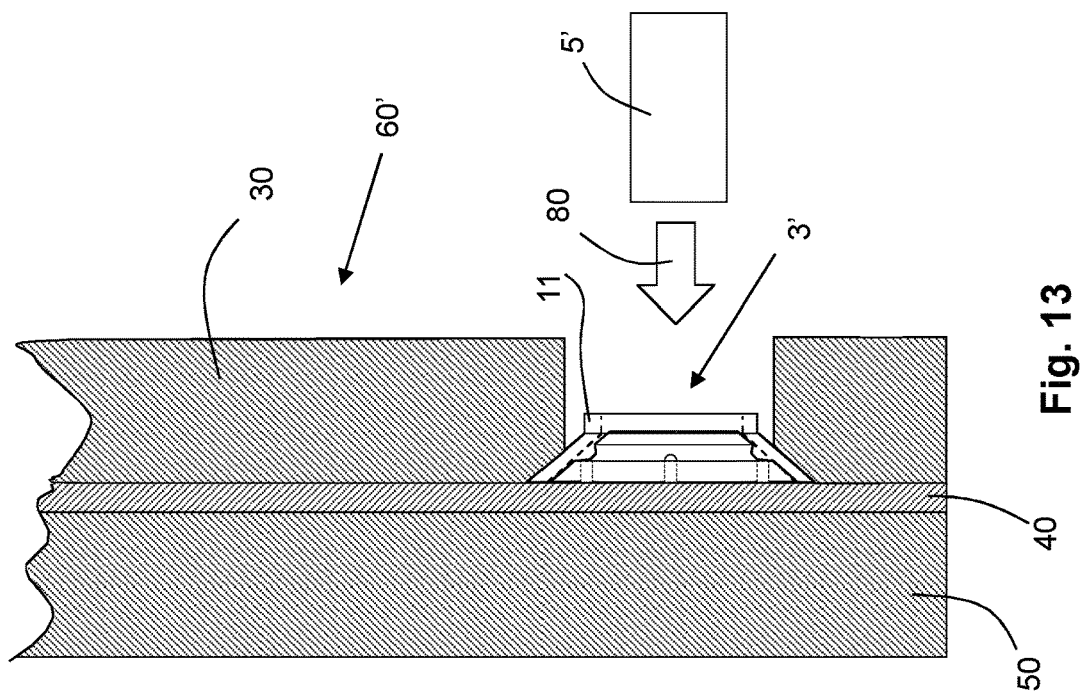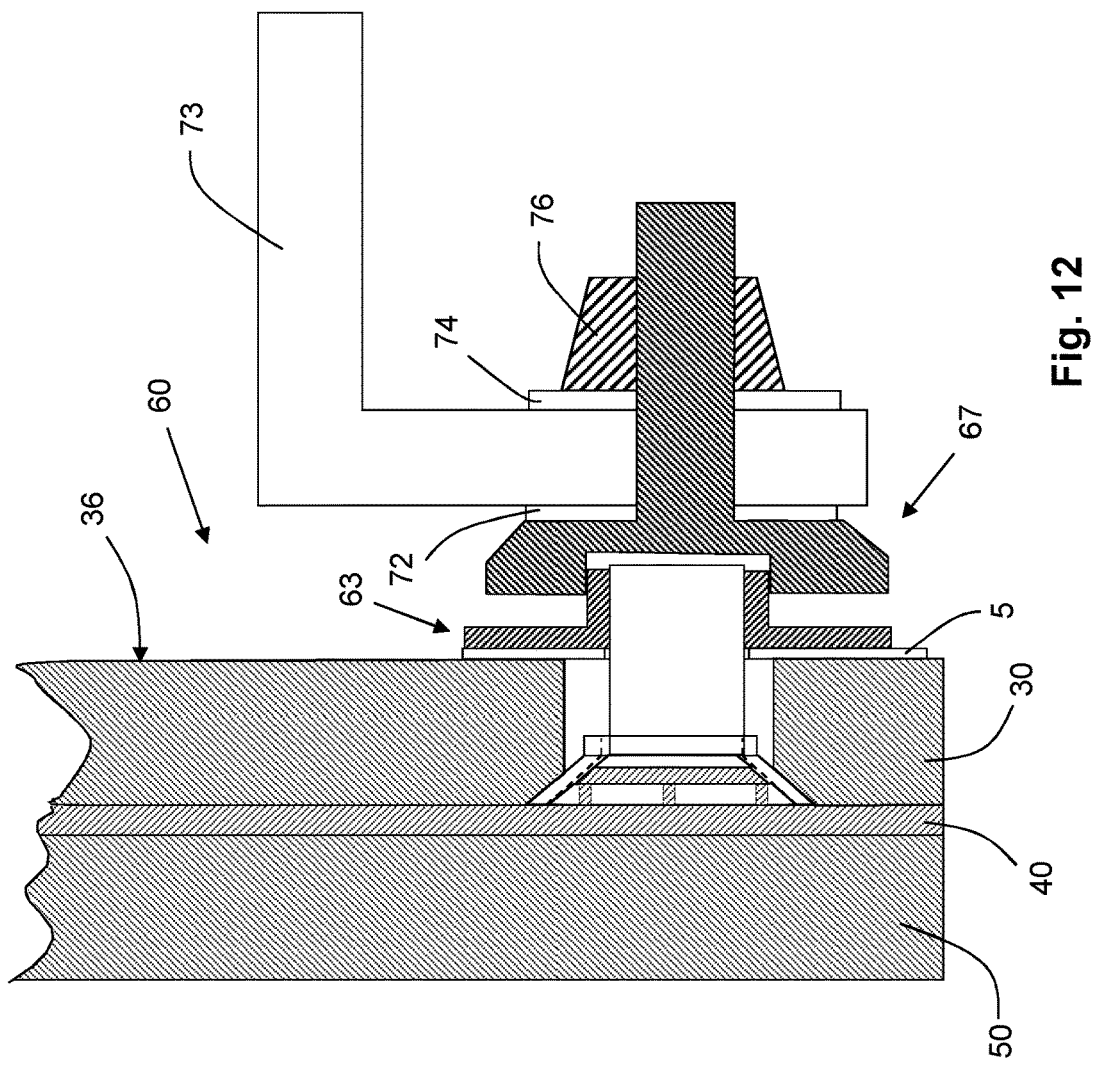

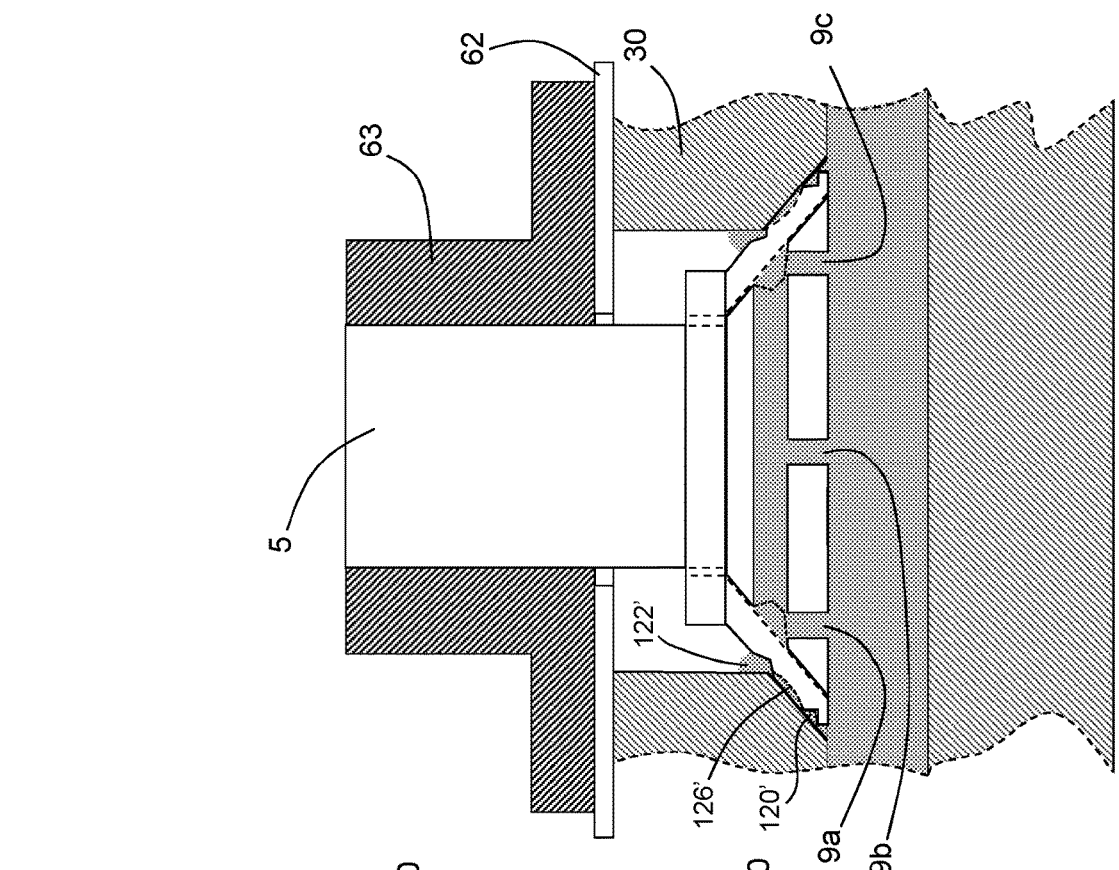
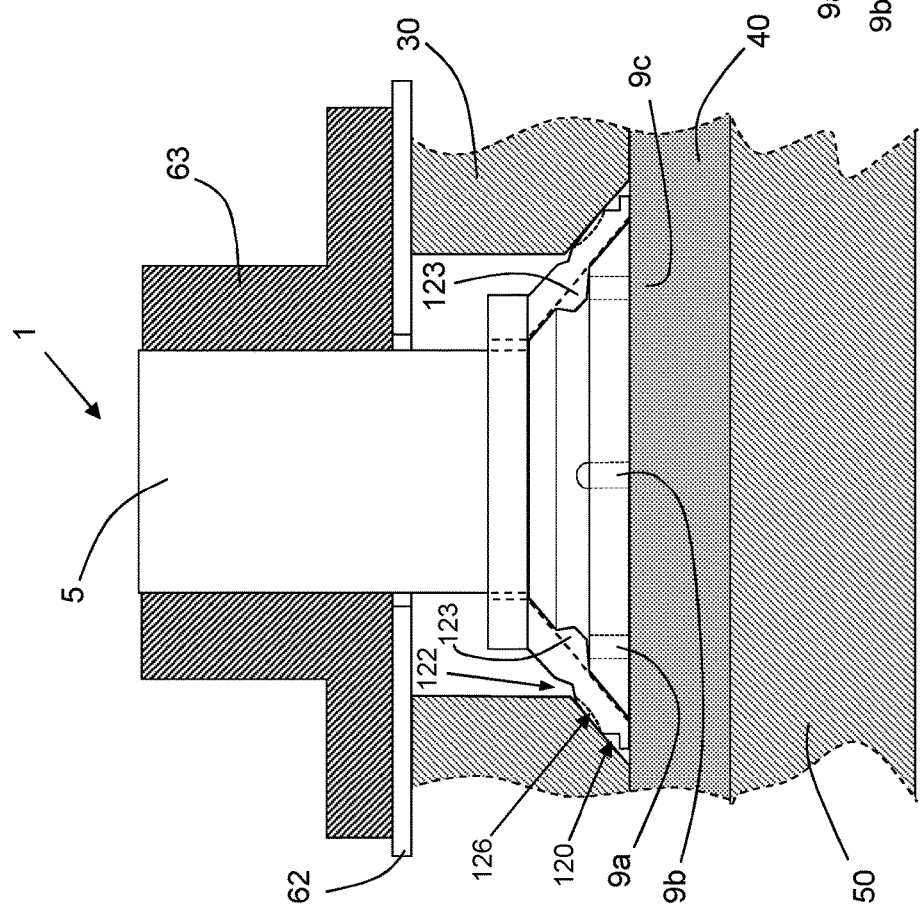

LAMINATED GLAZING PANEL

BACKGROUND OF THE INVENTION

The present invention relates to a laminated glazing panel, to a glazing fitting for securing to a laminated glazing and to a method for making a laminated glazing panel.

Frameless glazing systems for buildings are well known. Buildings incorporating a structural glass façade or curtain wall incorporating the Pilkington PLANAR™ glazing system are one such example. This type of structural glazing system comprises a plurality of glazing panels ranging typically in size between 1 m×1 m and 2.5 m×4.5 m or larger, for example 3m×6 m, wherein each glazing panel is independently secured to an adjacent support structure via mechanical mountings and fittings. Each glazing panel usually comprises a sheet of glass that has been toughened and may be laminated to meet specific legislative requirements. Each glazing panel may be double or triple glazed to provide increased environmental performance.

In such frameless glazing systems, each glazing panel usually has a number of holes drilled through it, which may be straight or countersunk holes, for securing a glazing fitting thereto. For a rectangular glazing panel, the fixing holes or bores are usually in the vicinity of each corner and a glazing fitting is secured to the glazing panel via each hole. Depending upon the size of the glazing panel, additional holes may be located at other positions around the periphery of the panel.

Frameless glazing systems are known comprising glazing panels having two sheets of glass joined by an interlayer sheet where the glazing fitting is secured to the glazing panel via a hole that passes through both sheets of glass, or via a hole that passes through only one of the sheets of glass. Such glazing panels are sold by Nippon Sheet Glass Co. and are known as Pilkington Planar™ Integral, see https://www.pilkington.com/en-gb/uk/architects/types-of-glass/structural-glazing/sy stem-components/glass/laminated-safety-glass/pilkington-planar-intergral.

Another known laminated glazing panel for use in a frameless glazing system is described in WO2006/121440A1. The glazing panel described in has internal and an external glass element bonded together by a polymer interlayer. A capped nut is embedded in the polymer interlayer and a bolt comprising a head and a threaded end is engaged with the embedded capped nut and passes through a circular fixing hole formed through the internal glass element. Such laminated glazing panels are also described in WO96/22443A1.

Embedding a capped nut in a polymer interlayer requires an additional cutting step, because in addition to cutting a hole in a glass sheet, a hole must also be made in the polymer interlayer so that the capped nut may be embedded therein. This additional process step can increase assembly time and production costs. Furthermore, it is necessary to carefully align the embedded capped nut with the holes in the glass sheet to allow access thereto.

There is a need for an alternative laminated glazing that at least partially overcomes the aforementioned problems.

SUMMARY OF THE INVENTION

Accordingly, the present invention provides from a first aspect a laminated glazing panel comprising: a first sheet of glazing material joined to a second sheet of glazing material by an interlayer structure comprising at least a first sheet of adhesive interlayer material, the first sheet of glazing material having a first major surface and an opposing second major surface; the laminated glazing panel being arranged such that the first major surface of the first sheet of glazing material faces the interlayer structure; there being a hole in the first sheet of glazing material, the hole having a wall between the first and second major surfaces of the first sheet of glazing material and being inboard of a peripheral edge of the first sheet of glazing material; the laminated glazing panel further comprising a glazing fitting secured thereto, the glazing fitting comprising: a head portion and an attachment feature, the head portion having a first surface and an opposing second surface, the head portion being positioned in the hole in the first sheet of glazing material such that the first surface thereof faces the first sheet of adhesive interlayer material; wherein some of the first sheet of adhesive interlayer material is in the hole in the first sheet of glazing material and is operatively associated with the first attachment feature thereby attaching the glazing fitting to the first sheet of adhesive interlayer material.

By operatively associating some of the first sheet of adhesive interlayer material with the first attachment feature, the glazing fitting remains attached to the first sheet of adhesive interlayer material even if the first sheet of glazing material is removed or the rigidity thereof is reduced, for example by breaking. This is particularly advantageous when the laminated glazing panel is used as a pane in a point fixed glazing system. In such a glazing system the glazing fitting may be secured to a suitable support structure, and in the event of breakage of the first sheet of glazing material the glazing fitting remains attached to the first sheet of adhesive interlayer material because some of the adhesive interlayer material of the first sheet of adhesive interlayer material is in the hole in the first sheet of glazing material and operatively associated with the first attachment feature. This prevents the second sheet of glazing material from falling away from the glazing system because the second sheet of glazing material is joined to the first sheet of adhesive interlayer material, and some of the first sheet of adhesive interlayer material is operatively associated with the first attachment feature of the head portion so that the glazing fitting is attached to the first sheet of adhesive interlayer material, the glazing fitting also being secured to the suitable support structure. This is particularly important when the second sheet of glazing material is an external facing pane in a building, because upon breaking the first sheet of glazing material, which would be an internal facing pane, the external pane remains secured to the support structure via the glazing fitting, instead of falling away outside of the building.

During a lamination process to make the laminated glazing panel, the first sheet of adhesive interlayer material softens and is able to flow into the hole in the first sheet of glazing panel. The glazing fitting is configured with at least one attachment feature such that some of the first sheet of adhesive interlayer material operatively associates with the attachment feature to attach the glazing fitting to the first sheet of adhesive interlayer material.

Preferably the second sheet of glazing material does not have any holes therein.

Preferably the first surface of the head portion is flat, or substantially flat.

Preferably the first surface of the head portion is aligned with the first major surface of the first sheet of glazing material.

The first surface of the head portion has an outer perimeter. Preferably the outer perimeter of the first surface of the head portion is circular, or substantially circular. Other shapes for the outer perimeter of the first surface of the head portion are possible, for example oval, triangular, quadrilateral, pentagonal, hexagonal etc.

Preferably the first and second surfaces of the head portion are arranged to provide a countersunk head portion. That is, it is preferred that the head portion is a countersunk head portion.

The hole in the first sheet of glazing material has a first opening in the first major surface of the first sheet of glazing material in communication with a second opening in the second major surface of the first sheet of glazing material. The wall of the hole connects the first opening in the first major surface of the first sheet of glazing material to the second opening in the first sheet of glazing material. That is, the wall of the hole is between the first opening in the first major surface of the first sheet of glazing material and the second opening in the second major surface of the first sheet of glazing material.

In some embodiments the head portion has at least a first channel extending between the first and second surfaces thereof, the first channel having a first end and a second end; the first channel communicating with an entrance hole in the first surface of the head portion at the first end and with an exit hole in the second surface of the head portion at the second end, and wherein some of the first sheet of adhesive interlayer material is in the first channel That is, some of the first sheet of adhesive interlayer material extends through the entrance hole in first surface of the head portion into the first channel in the head portion of the glazing fitting. In these embodiments the head portion is provided with an attachment feature being the first channel.

Preferably the first channel is configured such that between the first and second ends thereof some of the first sheet of adhesive interlayer material operatively communicates with the first channel to attach the glazing fitting to the first sheet of adhesive interlayer material.

Preferably some of the first sheet of adhesive interlayer material extends through the exit hole in the second surface of the head portion.

Preferably some of the first sheet of adhesive interlayer material extends through the exit hole in the second surface of the head portion to contact the second surface of the head portion.

Preferably the second surface of the head portion comprises a groove portion in communication with the exit hole of the first channel.

Preferably the groove portion extends around the second surface of the head portion.

Preferably the groove portion extends in a ring around the second surface of the head portion.

Preferably some of the first sheet of adhesive interlayer material is in the groove portion and operatively associated therewith to attach the glazing fitting to the first sheet of adhesive interlayer material.

In some embodiments the head portion is configured such that at least part of the head portion is spaced apart from the wall of the hole by a first space, and the second surface of the head portion is configured to provide at least one attachment feature, wherein some of the first sheet of adhesive interlayer material is in the first space between the wall of the hole and the head portion and some of the first sheet of adhesive interlayer material is operatively associated with the at least one attachment feature of the second surface of the head portion.

In such embodiments, at least a part of the outer perimeter of the first surface of the head portion is spaced apart from the first opening in the first major surface of the first sheet of glazing material so that some of the first sheet of adhesive interlayer material can flow into the first space during a lamination process used to make the laminated glazing panel to operatively associate with the at least one attachment feature of the second surface of the head portion.

Preferably the at least one attachment feature of the second surface of the head portion comprises at least a first recess in the second surface of the head portion and some of the first sheet of adhesive interlayer material is in at least a portion of the first recess in the second surface of the head portion.

Preferably the first recess in the second surface of the head portion extends around the second surface of the head portion.

Preferably the first recess in the second surface of the head portion extends around the second surface of the head portion in a ring, which may or may not be a closed ring.

Preferably the first recess in the second surface of the head portion is adjacent to the outer perimeter of the first surface of the head portion.

Preferably the first recess in the second surface of the head portion comprises a stepped region and/or an undercut region.

In some embodiments the head portion has at least a first channel extending between the first and second surfaces thereof, the first channel having a first end and a second end; the first channel communicating with an entrance hole in the first surface of the head portion at the first end, and with an exit hole in the second surface of the head portion at the second end, and some of the first sheet of adhesive interlayer material is in the first channel; and the head portion is configured such that at least part of the head portion is spaced apart from the wall of the hole by a first space, and the second surface of the head portion is configured to provide at least one attachment feature, wherein some of the first sheet of adhesive interlayer material is in the first space between the wall of the hole and the head portion and some of the first sheet of adhesive interlayer material is operatively associated with the at least one attachment feature of the second surface of the head portion.

In some embodiments the glazing fitting further comprises a washer configured to fit in the hole in the first sheet of glazing material and configured such that the head portion nests therein, the washer having an internal surface and an opposing external surface; the internal surface of the washer facing the second surface of the head portion and the external surface of the washer being configured to contact at least a portion of the wall of the hole, the external surface of the washer also being configured to provide at least one attachment feature; wherein the external surface of the washer is spaced apart from the wall of the hole in the first sheet of glazing material by at least a first space, and wherein some of the first sheet of adhesive interlayer material is in the first space between the wall of the hole and the external surface of the washer; and wherein some of the first sheet of adhesive interlayer material is operatively associated with the at least one attachment feature of the external surface of the washer.

Preferably the washer is a cup washer.

Preferably the external surface of the washer is configured to nest in the hole.

Preferably the external wall of the washer is configured such that a contact portion of the external surface of the washer contacts at least a portion of the wall of the hole.

The external surface of the washer and the internal surface of the washer are spaced apart to define a thickness of the washer.

Preferably the washer has a first minor surface at one end thereof and a second minor surface at the opposite end thereof.

Preferably the first minor surface of the washer is flat, or substantially flat.

Preferably the first minor surface of the washer is aligned with the first surface of the head portion and/or the first major surface of the first sheet of glazing material.

Preferably the second minor surface of the washer is flat, or substantially flat.

The external surface of the washer intersects with the first minor surface of the washer to define an outer edge of the washer.

Preferably the attachment feature of the external surface of the washer comprises a first recess in the external surface of the washer. It is preferred that the first recess in the second surface of the washer extends around the external surface of the washer, preferably in a ring, which may or may not be a closed ring. It is also preferred that the first recess in the external surface of the washer be adjacent to an outer edge of the washer.

Preferably the first recess in the external surface of the washer is at least partially filled with some of the first sheet of adhesive interlayer material.

Preferably the first recess in the external surface of the washer comprises a stepped region and/or an undercut region.

Preferably the external surface of the washer comprises a second recess, the second recess being spaced apart from the first recess preferably by a portion of the external wall of the washer that is in contact with at least a portion of the wall of the hole, the second recess in the external surface of the washer also being an attachment feature of the external surface of the washer.

Preferably the second recess in the external surface of the washer extends around the external surface of the washer, preferably in a ring.

Preferably the second recess in the external surface of the washer is in communication with the first recess in the external surface of the washer by at least one pathway in a portion of the external surface of the washer, preferably a portion of the external surface of the washer in contact with at least a portion of the wall of the hole.

Preferably the second recess in the external surface of the washer comprises a stepped region and/or an undercut region.

Preferably the second recess in the external surface of the washer is at least partially filled with some of the first sheet of adhesive interlayer material.

In some embodiments the head portion has at least a first channel extending between the first and second surfaces thereof, the first channel having a first end and a second end; the first channel communicating with an entrance hole in the first surface of the head portion at the first end, and with an exit hole in the second surface of the head portion at the second end, and some of the first sheet of adhesive interlayer material extends through the entrance hole in first surface of the head portion into the first channel in the head portion of the glazing fitting; the glazing fitting also comprising a washer configured to fit in the hole and configured for the head portion to nest therein, the washer having an internal surface and an opposing external surface, the internal surface of the washer facing the second surface of the head portion, at least one of the second surface of the head portion and the internal surface of the washer being configured to define a cavity between the internal surface of the washer and the second surface of the head portion for containing some of the first sheet of adhesive interlayer material from the exit hole, the cavity being in communication with the exit hole of the first channel.

In these embodiments the cavity is between the washer and the head portion and the head portion is between the cavity and the first sheet of adhesive interlayer material.

Preferably the second surface of the head portion comprises a groove portion in communication with the exit hole, wherein the cavity is formed between the groove portion and the internal surface of the washer.

Preferably the second surface of the head portion comprises a groove portion that extends around the second surface of the head portion, the groove portion being in communication with the exit hole, wherein the cavity is formed between the groove portion and the internal surface of the washer.

Preferably the internal surface of the washer comprises a groove portion opposite the exit hole, wherein the cavity is formed between the groove portion in the internal surface of the washer and the second surface of the head portion.

Preferably some of the first sheet of adhesive interlayer material is in the cavity and operatively associated therewith to attach the glazing fitting to the first sheet of glazing material.

Preferably the washer is a cup washer.

In some embodiments the glazing fitting further comprises a washer configured to fit in the hole in the first sheet of glazing material and configured such that the head portion nests therein, the washer having an internal surface and an opposing external surface; the internal surface of the washer facing the second surface of the head portion and the external surface of the washer being configured to contact at least a portion of the wall of the hole, the external surface of the washer also being configured to provide at least one attachment feature; wherein the external surface of the washer is spaced apart from the wall of the hole in the first sheet of glazing material by at least a first space, and wherein some of the first sheet of adhesive interlayer material is in the first space between the wall of the hole and the external surface of the washer and some of the first sheet of adhesive interlayer material is operatively associated with the at least one attachment feature of the external surface of the washer; and the head portion has at least a first channel extending between the first and second surfaces thereof, the first channel having a first end and a second end; the first channel communicating with an entrance hole in the first surface of the head portion at the first end, and with an exit hole in the second surface of the head portion at the second end, and some of the first sheet of adhesive interlayer material extends through the entrance hole in first surface of the head portion into the first channel in the head portion of the glazing fitting.

Preferably the washer is a cup washer.

Embodiments having a head portion comprising a first channel extending between the first and second surfaces thereof have other preferable features.

Preferably the head portion has two, or three, or four or more channels extending between the first and second surfaces of the head portion, each respective channel having a respective first end and a respective second end, each respective channel communicating with a respective entrance hole in the first surface of the head portion at the respective first end and with a respective exit hole in the second surface of the head portion at the respective second end.

Preferably at least one other channel between the first and second surfaces of the head portion has some of the first sheet of adhesive interlayer material extending therethrough to attach the glazing fitting to the first sheet of adhesive interlayer material.

Preferably the glazing fitting comprises a washer configured to fit in the hole and configured for the head portion to nest therein, the washer having an internal surface and an opposing external surface, the internal surface of the washer facing the second surface of the head portion to define a cavity therewith for containing a portion of the first sheet of adhesive interlayer material from the exit hole, the cavity being in communication with the exit hole of the first channel and at least one of the other channels in the head portion.

In some embodiments the glazing fitting comprises a stem portion, the stem portion extending away from the head portion and beyond the second major surface of the first sheet of glazing material.

Preferably the stem portion is cylindrical having a length and a radius and a first axis along the length.

Preferably the stem portion is integrally formed with the head portion. In such embodiments the stem portion integrally formed with the head portion is usually referred to as bolt in the art.

Preferably the stem portion is made from a stainless steel.

Preferably the stem portion is made from the same material as the head portion.

Preferably a mechanical fastener is attached to the stem portion and the glazing fitting is clamped to first sheet of glazing material between the mechanical fastener and the head portion.

Preferably the stem portion comprises a threaded portion and a mechanical fastener is screwed onto the threaded portion.

In some embodiments where the glazing fitting comprises a washer configured to fit in the hole and configured for the head portion to nest therein, the washer having an internal surface and an opposing external surface, the internal surface of the washer facing the second surface of the head portion to define a cavity therewith for containing a portion of the first sheet of adhesive interlayer material from the exit hole, the cavity being in communication with the exit hole of the first channel, and wherein the glazing fitting comprises a stem portion, the stem portion extending away from the head portion and beyond the second major surface of the first sheet of glazing material, the washer has a hole therein and the stem portion extends through the hole in the washer.

In embodiments wherein the glazing fitting comprises a washer and a stem portion, the stem portion extends through a second opening of the washer.

Other embodiments of the first aspect of the present invention have other preferable features.

Preferably the glazing fitting is attached to the first sheet of adhesive interlayer material and clamped to the first sheet of glazing material, more preferably the glazing fitting is attached to the first sheet of adhesive interlayer material by some of the first sheet of adhesive interlayer material extending into the hole in the first sheet of glazing material to operatively associate with the attachment feature and the glazing fitting is clamped to the first sheet of glazing material.

Preferably the head portion of the glazing fitting comprises a countersunk portion.

Preferably the first surface of the head portion is aligned with the first major surface of the first sheet of glazing material.

Preferably the head portion is made from a stainless steel.

Preferably the first sheet of adhesive interlayer material comprises an ionomer polymer, polyvinyl butyral (PVB), acoustic modified PVB, a copolymer of ethylene such as ethylene vinyl acetate (EVA), polyurethane (PU), polycarbonate, poly vinyl chloride (PVC) or a copolymer of ethylene and methacrylic acid.

Preferably the first and/or second sheet of glazing material comprises a sheet of glass, in particular a sheet of float glass.

Preferably the first and/or second sheet of glazing material comprises a sheet of soda-lime-silicate glass. Preferably the soda-lime-silicate glass has a composition comprising (by weight), $SiO_2$ 69-74%; $Al_2O_3$ 0-3%; $Na_2O$ 10-16%; $K_2O$ 0-5%; MgO 0-6%; CaO 5-14%; SO3 0-2% and $Fe_2O_3$ 0.005-2%.

Preferably the first and/or second sheet of glazing material is thermally toughened glass or chemically toughened glass.

Preferably the first sheet of glazing material has a thickness between 4 mm and 25 mm, more preferably between 6 mm and 20 mm.

Preferably the second sheet of glazing material has a thickness between 4 mm and 25 mm, more preferably between 6 mm and 20 mm.

Preferably the first sheet of adhesive interlayer material has thickness between 0.3 mm and 5 mm, more preferably between 0.38 mm and 1 mm.

When present, preferably the washer is made from aluminium.

The present invention also provides from a second aspect a glazing fitting for a laminated glazing panel, the laminated glazing panel comprising first and second sheets of glazing material joined together by at least a first sheet of adhesive interlayer material, the glazing fitting being configured for securing to a hole in the first sheet of glazing material, the hole extending between opposing major surfaces of the first sheet of glazing material; the glazing fitting comprising: a head portion having a first surface for facing the first sheet of adhesive interlayer material and an opposing second surface; and an attachment feature for operatively associating with some of the first sheet of adhesive interlayer material during a lamination process for making the laminated glazing panel to attach the glazing fitting to the first sheet of adhesive interlayer material following the lamination process.

Preferably the attachment feature comprises at least a first channel extending through the head portion communicating at a first end with an entrance hole in the first surface of the head portion and at a second end with an exit hole in the second surface of the head portion.

Preferably the second surface of the head portion comprises a groove portion in communication with the exit hole.

Preferably second surface of the head portion comprises a groove portion extending around the second surface of the head portion, preferably in a ring.

Preferably the second surface of the head portion is configured to provide at least one attachment feature.

Preferably the at least one attachment feature of the second surface of the head portion comprises a recess in the second surface of the head portion Preferably the recess in the second surface of the head portion extends around the entire second surface of the head portion.

Preferably the recess in the second surface of the head portion is adjacent to an outer periphery of the first surface of the head portion.

Preferably the recess in the second surface of the head portion comprises a stepped region and/or an undercut region.

In some embodiments the glazing fitting further comprises a washer configured to fit in the hole in the first sheet of glazing material and configured for the head portion to nest therein, the washer having an internal surface and an opposing external surface; the internal surface of the washer for facing the second surface of the head portion and the external surface of the washer being configured to contact at least a portion of the wall of the hole in the first sheet of glazing material, and wherein the external surface of the washer is configured to provide at least one attachment feature.

Preferably the attachment feature of the external surface of the washer comprises a first recess in the external surface of the washer.

Preferably the first recess in the second surface of the washer extends around the external surface of the washer, preferably in a ring, which may or may not be a closed ring.

Preferably the first recess in the external surface of the washer is adjacent to an outer edge of the washer.

Preferably the first recess in the external surface of the washer comprises a stepped region and/or an undercut region.

Preferably the external surface of the washer comprises a second recess, the second recess being spaced apart from the first recess preferably by a portion of the external wall of the washer.

Preferably the portion of the external wall of the washer between the first and second recesses is configured for contacting the wall of the hole in the first sheet of glazing material.

Preferably the second recess in the external surface of the washer extends around the external surface of the washer, preferably in a ring.

Preferably the second recess in the external surface of the washer is in communication with the first recess in the external surface of the washer by at least one pathway in the portion of the external surface of the washer between the first and second recesses in the external surface of the washer.

Preferably the second recess in the external surface of the washer comprises a stepped region and/or an undercut region.

Preferably the washer is a cup washer.

Preferably the attachment feature comprises at least a first channel extending through the head portion communicating at a first end with an entrance hole in the first surface of the head portion and at a second end with an exit hole in the second surface of the head portion and the internal surface of the washer is configured to define a cavity between the internal surface of the washer and the second surface of the head portion when the head portion is nested in the washer, the cavity being in communication with the exit hole of the first channel In some embodiments the glazing fitting comprises a stem portion extending away from the second surface of the head portion.

Preferably the stem portion is cylindrical having a length and a radius and a first axis along the length.

Preferably the stem portion comprises a threaded portion for engagement with a suitable mechanical fastener.

Preferably the stem portion is integrally formed with the head portion.

Preferably the stem portion is substantially cylindrical.

Preferably the stem portion is made from a stainless steel.

In some embodiments the head portion of the glazing fitting has two, or three, or four or more than four channels extending between the first and second surfaces of the head portion, each respective channel having a respective first end and a respective second end, each respective channel communicating with a respective entrance hole in the first surface of the head portion at the respective first end, and with a respective exit hole in the second surface of the head portion at the respective second end of the channel Other embodiments of the second aspect of the present invention have other preferable features.

Preferably the head portion is made from a stainless steel.

Preferably the head portion has two channels extending through the head portion, each channel respectively communicating at a first end with a respective entrance hole in the first surface of the head portion and at a second end with a respective exit hole in the second surface of the head portion, wherein when view in plan elevation, the two channels are on opposite sides of the head portion.

Preferably the head portion has four channels extending through the head portion, each channel respectively communicating at a first end with a respective entrance hole in the first surface of the head portion and at a second end with a respective exit hole in the second surface of the head portion, wherein when viewed in plan elevation, the four channels are equally spaced around the head portion.

Preferably the head portion has four channels extending through the head portion, each channel respectively communicating at a first end with a respective entrance hole in the first surface of the head portion and at a second end with a respective exit hole in the second surface of the head portion, and the glazing fitting comprises a stem portion extending away from the second surface of the head portion, wherein when viewed along a longitudinal axis of the stem portion, the four channels are equally spaced around the stem portion.

Preferably the head portion is a countersunk head portion.

Preferably the glazing fitting comprises a mechanical fastener for attaching to a stem portion extending from the head portion.

The present invention also provides from a third aspect a method for making a laminated glazing panel comprising the steps: (i) providing a first sheet of glazing material having at least a first hole extending between a first and a second major surface thereof; (ii) providing a glazing fitting according to the second aspect of the present invention; (iii) positioning the head portion of the glazing fitting in the hole such that the first surface of the head portion faces in the direction of the first major surface of the first sheet of glazing material; (iv) providing a first sheet of adhesive interlayer material; (v) positioning the first sheet of adhesive interlayer material on the first major surface of the first sheet of glazing material to cover the first surface of the head portion; (vi) laminating the first sheet of adhesive interlayer material to the first sheet of glazing material using suitable lamination conditions; wherein during step (vi) the head portion is configured such that some of the first sheet of adhesive interlayer material flows into the hole to operatively associate with the attachment feature to attach the glazing fitting to the first sheet of adhesive interlayer material.

Preferably following step (v) a second sheet of glazing material is positioned on the first sheet of adhesive interlayer material such that following step (vi) the laminated glazing panel produced has the first sheet of adhesive interlayer material between the first and second sheets of glazing material. Preferably the second sheet of glazing material has no holes therein.

Preferably the first sheet of adhesive interlayer material comprises an ionomer polymer, polyvinyl butyral (PVB), acoustic modified PVB, a copolymer of ethylene such as ethylene vinyl acetate (EVA), polyurethane (PU), polycarbonate, poly vinyl chloride (PVC) or a copolymer of ethylene and methacrylic acid.

Preferably the first second sheet of glazing material comprises a sheet of glass, in particular a sheet of float glass.

Preferably the first sheet of glazing material comprises a sheet of soda-lime-silicate glass. Preferably the soda-lime-silicate glass has a composition comprising (by weight), $SiO_2$ 69-74%; $Al_2O_3$ 0-3%; $Na_2O$ 10-16%; $K_2O$ 0-5%; MgO 0-6%; CaO 5-14%; $SO_3$ 0-2% and $Fe_2O_3$ 0.005-2%.

Preferably the first sheet of glazing material is thermally toughened glass or chemically toughened glass.

Preferably the first sheet of glazing material has a thickness between 4 mm and 25 mm, more preferably between 6 mm and 20 mm.

Preferably the first sheet of adhesive interlayer material has thickness between 0.3 mm and 5 mm, more preferably between 0.38 mm and 1 mm.

The first sheet of adhesive interlayer material may comprise one or more sheets of adhesive interlayer material.

When present, the second sheet of glazing material preferably has a thickness between 4 mm and 25 mm, more preferably between 6 mm and 20 mm.

When the glazing fitting comprises a stem portion extending away from the head portion, at step (iii) the stem portion passes through an opening in the second major surface of the first sheet of glazing material.

BRIEF DESCRIPTION OF THE DRAWINGS

Embodiments of the present invention will now be described by way of example only with reference to the accompanying drawings, in which:

FIG. 1 shows a schematic side view of a bolt and cup washer that are part of a glazing fitting in accordance with the present invention;

FIG. 2 is a plan view of the bolt shown in FIG. 1;

FIG. 3 is a plan view of the cup washer shown in FIG. 1;

FIG. 4 is a plan view of the bolt in the cup washer shown in FIG. 1;

FIG. 5 is a schematic cross-sectional view of part of the countersunk head of the bolt in the cup washer of FIG. 1;

FIG. 6 is a schematic cross-sectional representation of a sheet of glass having a countersunk hole therein for connection to a glazing fitting in accordance with the present invention;

FIG. 12 shows a schematic cross-sectional view of a laminated glazing panel according to the present invention shown attached to a bracket in a building;

FIG. 13 shows a schematic cross-sectional view of another laminated glazing panel in accordance with the present invention where the head portion is connectable with a stem portion;

FIG. 18 shows a close-up view of the bolt nested in the cup washer which is nested in a countersunk hole in a sheet of glass prior to a lamination process, the bolt being clamped to the sheet of glass; and FIG. 19 shows a close-up view of the bolt nested in the cup washer which is nested in a countersunk hole in the sheet of glass following a suitable lamination process;

DETAILED DESCRIPTION OF THE INVENTION

Figure 7:
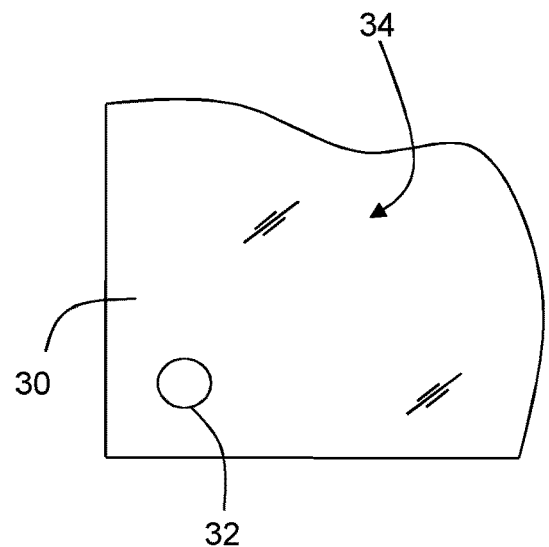
FIG. 7 shows a plan view of a portion of the sheet of glass shown in FIG. 6.

FIG. 1 shows a schematic cross-sectional view of a bolt 1 and a cup washer 11 that are part of a glazing fitting in accordance with an aspect of the present invention. FIG. 2 is a plan view of the bolt shown in FIG. 1. FIG. 3 is a plan view of the cup washer shown in FIG. 1. FIG. 4 is a plan view of the bolt and cup washer of FIG. 1 where the bolt is in the cup washer.

With reference to FIGS. 1-4, the bolt 1 is made of stainless steel and has a countersunk head portion 3 and a stem portion 5 integrally formed therewith. In this embodiment the stem portion 5 is threaded for engagement with a suitably sized nut (not shown) or other similar mechanical fastener. The stem portion 5 is substantially cylindrical having a length and a radius.

The countersunk head portion 3 has a flat first surface 4 and an opposing second surface 6 tapered towards the stem portion 5. Passing through the countersunk head portion 3 are four straight channels 9a, 9b, 9c and 9d (9d not shown in FIG. 1). Each channel 9a, 9b, 9c, 9d is normal to the first surface 4 and communicates at one end with a respective entrance hole in the first surface 4, and at the other end with a respective exit hole in the second surface 6. For example, the channel 9b has an entrance hole 9b' in the first surface 4 and an exit hole 9b" in the second surface 6.

The first surface 4 intersects with the second surface 6 to define an edge 8 of the countersunk head portion 3. The first surface 3 has a circular outer perimeter defined by the edge 8.

The second surface 6 has a groove 7 therein in communication with the exit holes of the channels 9a, 9b, 9c and 9d. The groove is substantially semi-circular in profile and has been formed by milling around the countersunk head portion. For example, a conventional countersunk bolt may have the groove 7 formed in the head portion by milling, followed by drilling the channels 9a, 9b, 9c, 9d to communicate with the first surface 4 and the groove 7 in the second surface 6.

The cup washer 11 is a washer having an opening 19 at one end thereof (and another opening at the opposite end, not labelled). The cup washer 11 has an external wall 13 and an internal wall 15. The internal wall 15 is suitably configured such that the countersunk head portion 3 can nest therein i.e. by moving the bolt 1 in the direction of arrow 10. The separation of the external wall 13 and the internal wall 15 defines the thickness of the cup washer. At one end the cup washer 11 has a minor surface 14. The minor surface 14 is flat.

The cup washer 11 has a collar portion 17 having an inner wall 18 that defines the periphery of the opening 19 in the cup washer. The opening 19 is suitably sized such that the stem portion 5 of the bolt 1 can pass therethrough.

In use, the cup washer is usually in direct contact with the glazing material, for example soda-lime-silicate glass, so the cup washer 11 is typically made from a softer material than the bolt 1. It is preferred that the bolt 1 is made from stainless steel and the cup washer 11 is made from aluminium.

When viewed in the direction of arrow 2 i.e. in plan view, the countersunk head portion 3 is circular and the groove 7 is concentric with the outer edge 8 of the head washer and inboard thereof. Exit holes 9a", 9b", 9c" and 9d" of respective channels 9a, 9b, 9c, 9d can be seen in communication with the groove 7. The edge 8 can be seen to be circular and defines the outer perimeter of the first surface 4.

The view of the bolt 1 in FIG. 1 is essentially a cross-section through the line j-j' of FIG. 2, with the inclusion of the position for channel 9b.

As more clearly seen in the plan view of FIG. 3 (i.e. viewed in the direction of arrow 2), the cup washer 11 has a circular opening 19 therein defined by the inner wall 18 of the collar portion 17. The cup washer has a circular periphery and the internal surface 15 is configured such that the countersunk head portion 3 of the bolt 1 can nest therein.

FIG. 4 shows a plan view when the bolt 1 is inserted through the opening 19 in the cup washer 11. The stem portion 5 extends through the hole 19 and is configured to be a sliding fit with the inner wall 18 of the collar portion 17.

FIG. 5 shows in more detail a portion of a cross-sectional view of FIG. 4 along the line m-m', again with the inclusion of the position for channel 9b.

With the countersunk head portion 3 nested in the cup washer 11, the stem portion 5 can be seen to extend through the opening 19 in the cup washer 11.

The internal wall 15 of the cup washer 11 defines a cavity 23 with the groove 7 in the second surface of the countersunk head portion 3. The cavity 23 extends around the countersunk head portion 3 because the groove 7 extends inboard of the edge 8 of the countersunk head portion 3 and the internal wall 15 nests with the countersunk head portion 3.

The channel 9a is in fluid communication with the cavity 23 such that fluid material may flow into the cavity 23 via the channel 9a i.e. in the direction of arrow 9aa.

The channel 9b is also in fluid communication with the cavity 23. Not shown in FIG. 5 are the channels 9c, 9d, which are also in fluid communication with the cavity 23.

FIGS. 6-10 are used to describe how a laminated glazing panel according to the present invention is made.

FIG. 6 shows a schematic cross-sectional representation of a bolt 1 and cup washer 11 as described with reference to FIGS. 1-5 prior to being secured to a sheet of glass 30.

Firstly, a first sheet of glass 30 is provided having a suitable countersunk hole 32 therein configured for the cup washer 11 to nest therein. The first sheet of glass 30 has a first major surface 34 and an opposing second major surface 36. The countersunk hole 32 has a wall 33 in between the first and second major surfaces 34, 36 of the first sheet of glass 30. The countersunk hole 32 has a first opening in first major surface 34 and a second opening in the second major surface 36. The first opening in the first major surface 34 is circular and the second opening in the second major surface 36 is also circular but has a smaller diameter than the first opening.

In plan view, the first sheet of glass 30 has a rectangular periphery and the countersunk hole 32 is inboard of the periphery i.e. inboard of the peripheral edge of the first sheet of glass 30.

FIG. 7 shows a plan view of a corner portion of the first sheet of glass 30. The other corner portions of the first sheet of glass 30 may have similar countersunk holes therein.

Again, with reference to FIG. 6, the cup washer 11 is first inserted into the countersunk hole 32 by moving in the direction of arrow 37. The external surface 13 of the cup washer 11 is configured to nest in the countersunk hole 32. Next, the bolt 1 is moved in the direction of arrow 39 so that the stem portion 5 passes through the opening 19 in the cup washer 11.

Figure 8:
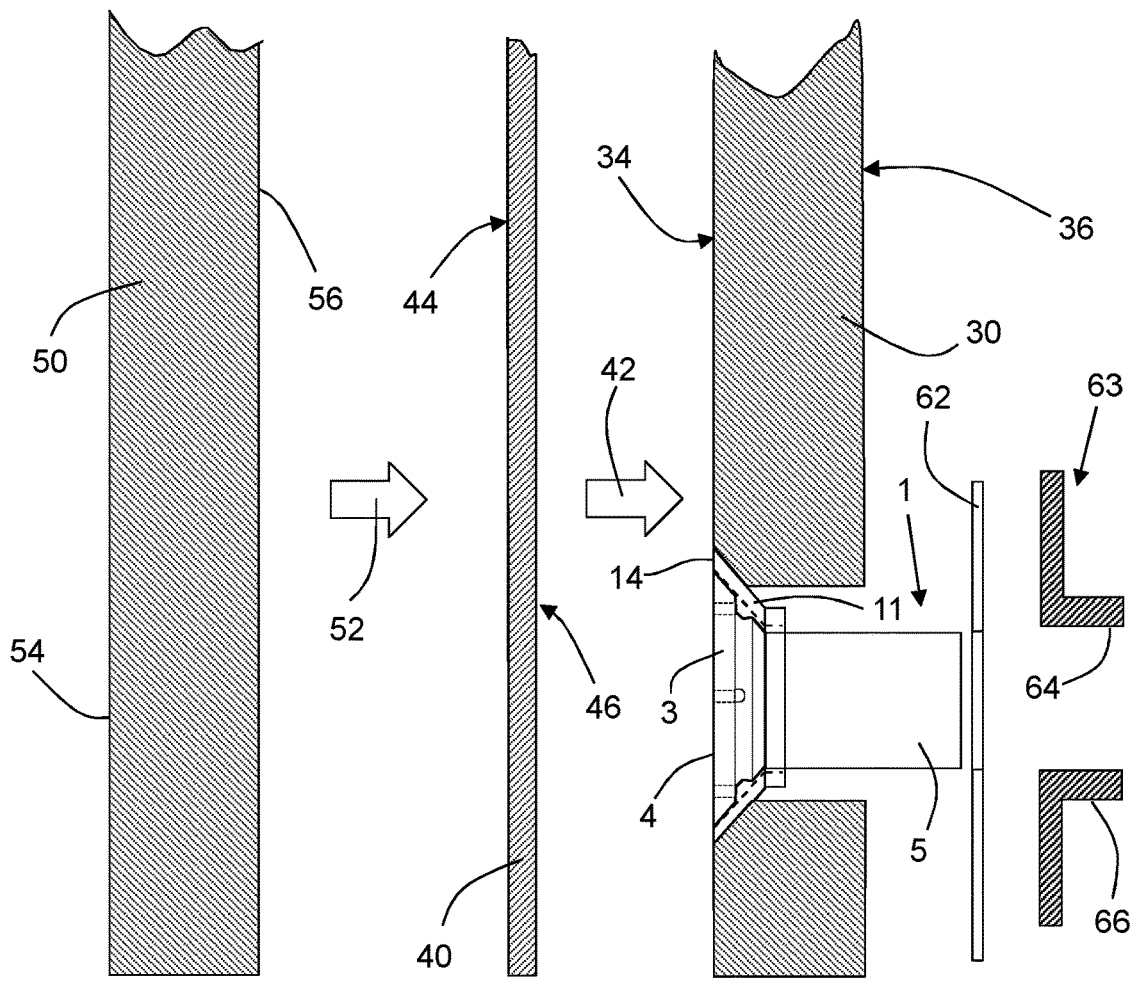
FIG. 8 shows an unlaminated stack of components for making a laminated glazing panel according to the present invention.

A schematic cross-sectional view of the cup washer 11 nesting in the countersunk hole 32 with the bolt 1 in the cup washer 11 is shown in FIG. 8. The head portion 3 of the bolt 1 nests in the cup washer 11 and the stem portion 5 extends through the opening 19 in the cup washer and extends beyond the second major surface 36 of the first sheet of glass 30. The minor surface 14 of the cup washer 11 and the first surface 4 of the head portion 3 are aligned with the first major surface 34 of the first sheet of glass 30.

The bolt 1 may be clamped to the first sheet of glass 30 prior to lamination by using a suitable mechanical fastener engaged with the stem portion 5. In FIG. 8, an inner flange 63 is screwed onto the threaded stem portion 5. A suitable washer 62 may first be positioned on the stem portion 5 to prevent the inner flange 63 from directly contacting the second major surface 36 of the first sheet of glass 30. The washer 62 is flat and made of aluminium. The inner flange 63 is made of stainless steel. The inner flange 63 may be tightened to a desired torque to clamp the bolt 1 to the first sheet of glass 30 prior to a suitable lamination process.

To make a laminated glazing panel in accordance with an embodiment of the present inventions, next a sheet of ionomer polymer 40 is positioned on the first major surface 34 of the first sheet of glass 30 by moving the sheet of ionomer polymer in the direction of arrow 42.

The sheet of ionomer polymer 40 has a first major surface 44 and a second opposing major surface 46 and is sized to be congruently stacked with the first sheet of glass 30 i.e. the edges of the first sheet of glass 30 are aligned with the edges of the sheet of ionomer polymer 40 when the sheet of ionomer polymer 40 is positioned on the first sheet of glass 30.

The sheet of ionomer polymer 40 has no holes therein and covers the first surface 4 of the head portion 3 of the bolt 1.

Next a second sheet of glass 50 is positioned on the sheet of ionomer polymer 40 by moving in the direction of arrow 52. The second sheet of glass 50 has a first major surface 54 and a second opposing major surface 56. The second sheet of glass 52 is sized to be coextensive with the sheet of ionomer polymer 40 such that when the second sheet of glass 50 is on the sheet of ionomer polymer 40, the second sheet of glass 50 is congruently stacked therewith. The second sheet of glass 50 does not have any holes therein, in particular there is no hole in the second sheet of glass directly opposite the countersunk hole 32 in the first sheet of glass 30. In use, the second sheet of glass 50 would be an external pane, and the first sheet of glass 30 would be an internal pane.

Figure 9:
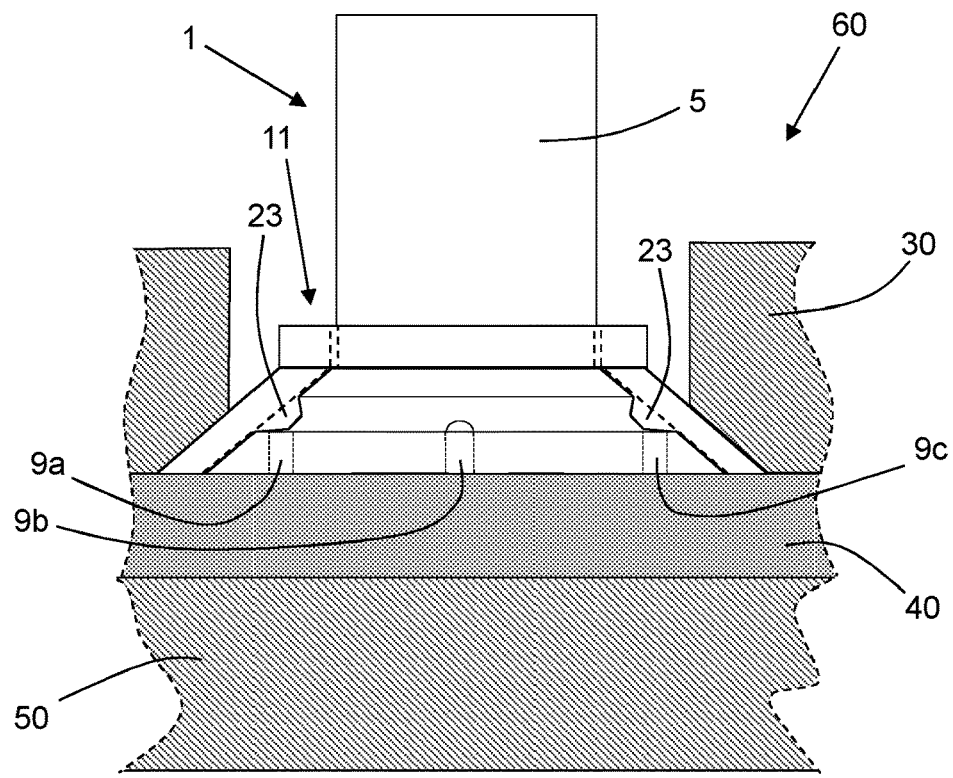
FIG. 9 shows a close-up view of the glazing fitting in the countersunk hole prior to a lamination process.

A schematic cross-sectional representation of a portion of the congruent stack described above prior to lamination is shown in FIG. 9. In FIG. 9, the arrangement of the bolt 1 in the cup washer 11 is as described with reference to FIG. 5. The bolt 1 is shown not clamped to the first sheet of glass 30 prior to lamination, but the bolt 1 may be clamped to the first sheet of glass 30 prior to lamination, as discussed above i.e. by using a mechanical fastener screwed onto the stem portion 5 of the bolt 1.

As can be seen from FIG. 9, the channels 9a, 9b and 9c face the sheet of ionomer polymer 40. Channel 9d (not shown) also faces the sheet of ionomer polymer 40.

Prior to lamination, the channels 9a, 9b, 9c, 9d and the cavity 23 are empty (other than containing the surrounding atmosphere) i.e. the channels 9a, 9b, 9c, 9d do not contain any ionomer polymer 40 from the sheet of ionomer polymer 40 and instead contain air.

In order to produce a laminated glazing panel in accordance with the present invention, the unlaminated congruent stack of components is laminated at a suitable temperature and pressure to join the first sheet of glass 30 to the second sheet of glass 50 by the sheet of ionomer polymer 40.

During the lamination process, the unlaminated stack of components may be placed in a vacuum bag or the like to evacuate air from between the components of the unlaminated stack.

During the lamination process, the sheet of ionomer polymer 40 softens and under the applied pressure is able to flow into the channels 9a, 9b, 9c, 9d and through into the cavity 23. It is preferred to completely fill the channels 9a, 9b, 9c, 9d and the cavity 23 with some of the ionomer polymer material that flows from the sheet of ionomer polymer 40 during the lamination process. This is illustrated in FIG. 10 which shows a schematic cross-sectional representation of a portion of the laminated glazing panel 60 following the lamination process.

Figure 10:
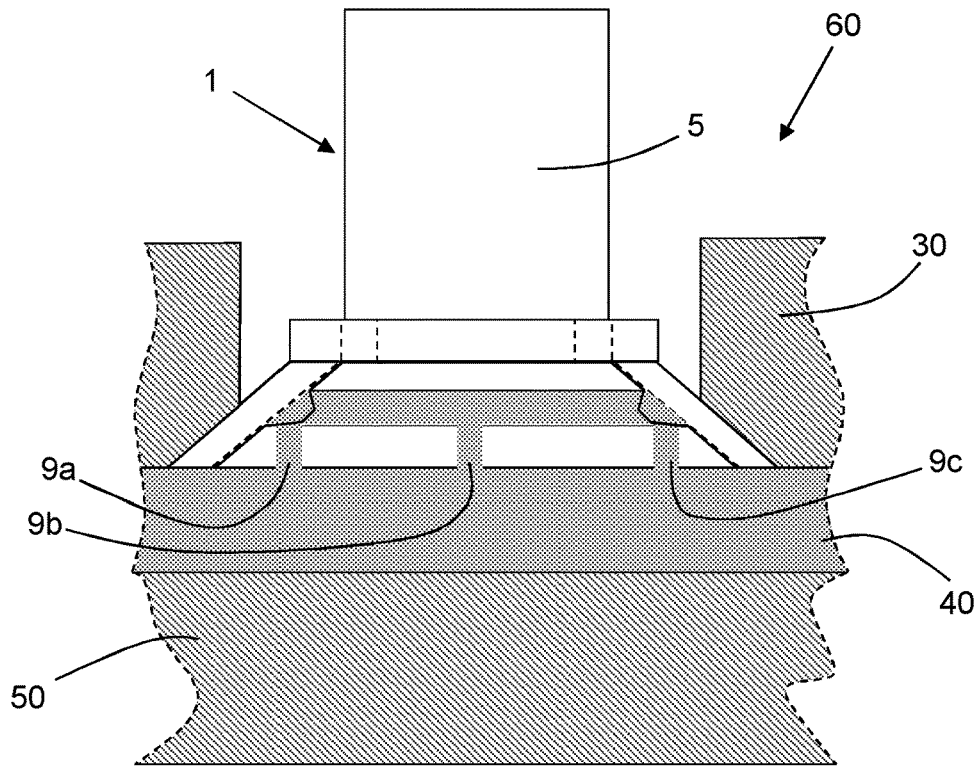
FIG. 10 shows a close-up view of the glazing fitting in the countersunk hole following a suitable lamination process.

In FIG. 10 the channels 9a, 9b and 9c and the cavity 23 are shaded grey to indicate that some ionomer polymer material from the sheet of ionomer material 40 is contained therein, and preferably fills the channels 9a, 9b and 9c (and 9d) and the cavity 23. In this way some of the ionomer polymer sheet operatively associates with the channels 9a, 9b, 9c, 9d and the cavity 23 so that the bolt 1 is attached to the sheet of ionomer material.

For a sheet of ionomer polymer such as SentryGlas Plus® available from DuPont, a temperature of around 140° C. and a pressure of 5-15 bar was found acceptable to cause the adhesive interlayer material to flow through the channels in the countersunk head portion, into the cavity and around the countersunk head portion.

Figure 11:
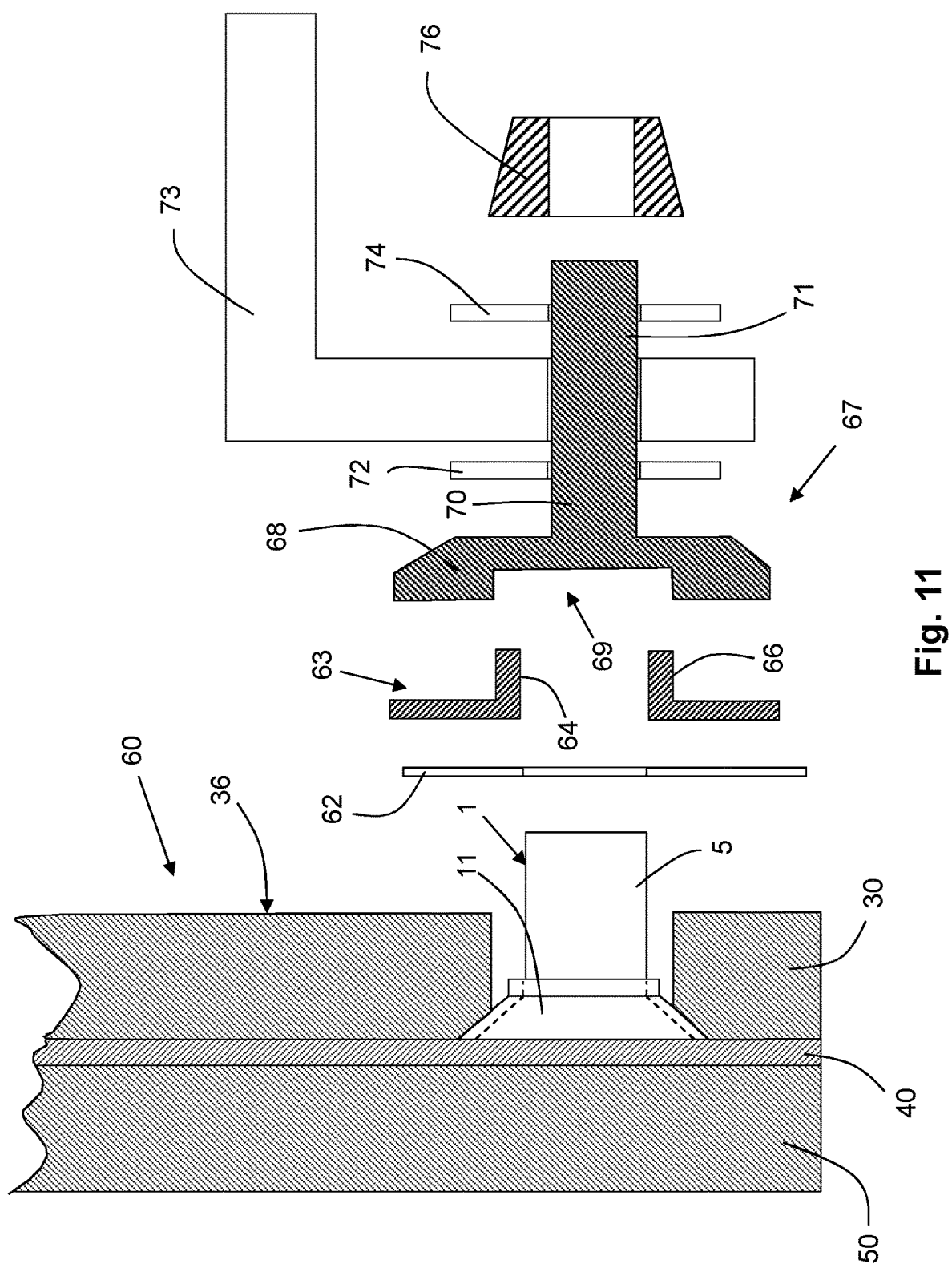
FIG. 11 shows a schematic cross-sectional view of a laminated glazing panel according to the present invention and a part exploded view of a mechanical fastener for connection to a bracket.

FIG. 11 shows in more detail the laminated glazing panel 60 and additional components that may be part of the glazing fitting. FIG. 11 also shows how additional mechanical fasteners elements may be secured to the glazing fitting to allow the laminated glazing panel to be attached to a building or the like.

As described above, the laminated glazing panel 60 has a bolt 1 and cup washer 11 secured in the hole in the sheet of glass 30 because the sheet of glass 30 is joined to the second sheet of glass 50 by the sheet of ionomer polymer 40.

Either prior to lamination, or thereafter, an inner flange 63 is screwed onto the threaded stem portion 5 of the bolt 1. The inner flange 63 is made of stainless steel and to avoid direct contact with the second major surface 36 of the sheet of glass 30 an aluminium washer 62 is first inserted over the stem portion 5 before the inner flange 63 engages therewith.

The inner flange 63 has an inner threaded section 64 for screwing onto the threaded stem portion 5, and an outer threaded section 66 for engagement with addition mechanical fasteners.

As discussed above, it is preferred to screw the inner flange 63 onto the threaded stem portion 5 to a desired torque prior to the lamination process.

When the inner flange 63 is screwed onto the threaded stem portion 5, an outer flange 67 may be attached thereto. The outer flange 67 has a body portion 68 having an opening 69 therein with threaded walls for screwing onto the outer threaded section 66 of the inner flange 63. The outer flange 67 also has integrally formed therewith a mounting portion 70. The outer flange 67 is also made of stainless steel.

The mounting portion 70 may be used to attach the laminated glazing panel 60 to a bracket 73 attached to a support structure in a building. The laminated glazing panel 60 may be a pane in a façade or other frameless glazing system.

The mounting portion 70 passes through an opening in the bracket 73 (which is made from stainless steel). Stainless steel washers 72, 74 are positioned either side of the opening in the bracket 73 and the mounting portion 70 passes through the washers 72, 74.

The mounting portion 70 has a threaded portion 71 for engagement with a suitable nut 76 to secure the outer flange 67 to the bracket (and hence the laminated glazing panel 60 to the bracket when the outer flange 67 is connected to the inner flange 63).

In use, the second sheet of glass 50 is an external pane (i.e. facing the outside of the building in which the laminated glazing panel 60 is installed) and the first sheet of glass 30 is an inner pane. In the event of breakage of the first sheet of glass 30, the mechanical integrity thereof becomes compromised, and without using the glazing fitting of the present invention, may result in the second sheet of glass 50 (with the sheet of ionomer polymer laminated thereto) becoming detached from the laminated glazing panel 60.

By using a glazing fitting in accordance with the present invention, the bolt 1 is attached to the sheet of ionomer polymer 40, which is laminated to the second sheet of glass 50. The second sheet of glass 50 is therefore prevented from falling away from the building because the bolt 1 is attached to the sheet of ionomer polymer 40, which is laminated to the second sheet of glass 50.

The laminated glazing panel 60 attached to the bracket 73 is shown in FIG. 12. In this figure the ionomer material in the channels and the cavity is shown to illustrate how the ionomer material from the sheet of ionomer polymer has flowed into the channels and cavity of the glazing fitting to attach the glazing fitting to the sheet of ionomer polymer.

If the first sheet of glass 30 is removed from the glazing panel shown in FIG. 12, the sheet of ionomer 40 with second sheet of glass joined thereto will remain secured to the bracket 73 via the glazing fitting and mechanical fasteners.

FIG. 13 illustrates a schematic cross-sectional view of another laminated glazing panel 60' in accordance with the present invention incorporating a different glazing fitting. Like parts are labelled with previously used reference numerals.

In this example, instead of using a bolt with an integrally form stem portion as previously described, the glazing fitting comprises a countersunk head portion 3' that does not have a stem portion integrally formed therewith. Otherwise, the countersunk head portion is configured in essentially the same way as the countersunk head portion 3 of the bolt 1 described with reference to FIG. 1.

The countersunk head portion 3' may be positioned in a cup washer 11 as previously described, and the laminated glazing panel may be produced as discussed above. However, in this example a stem portion 5' is attached to the countersunk head portion after lamination.

With reference to FIG. 13, the countersunk head portion 3' has a threaded inner wall for engagement with a threaded stem portion 5'. Other connection means may be used to connect the stem portion 5' to the countersunk head portion 3'. Once the stem portion 5' is screwed to the countersunk head portion 3' (by moving in the direction of arrow 80), the laminated glazing panel may be mounted to a bracket in a building as described with reference to FIGS. 11 and 12.

Figure 14:
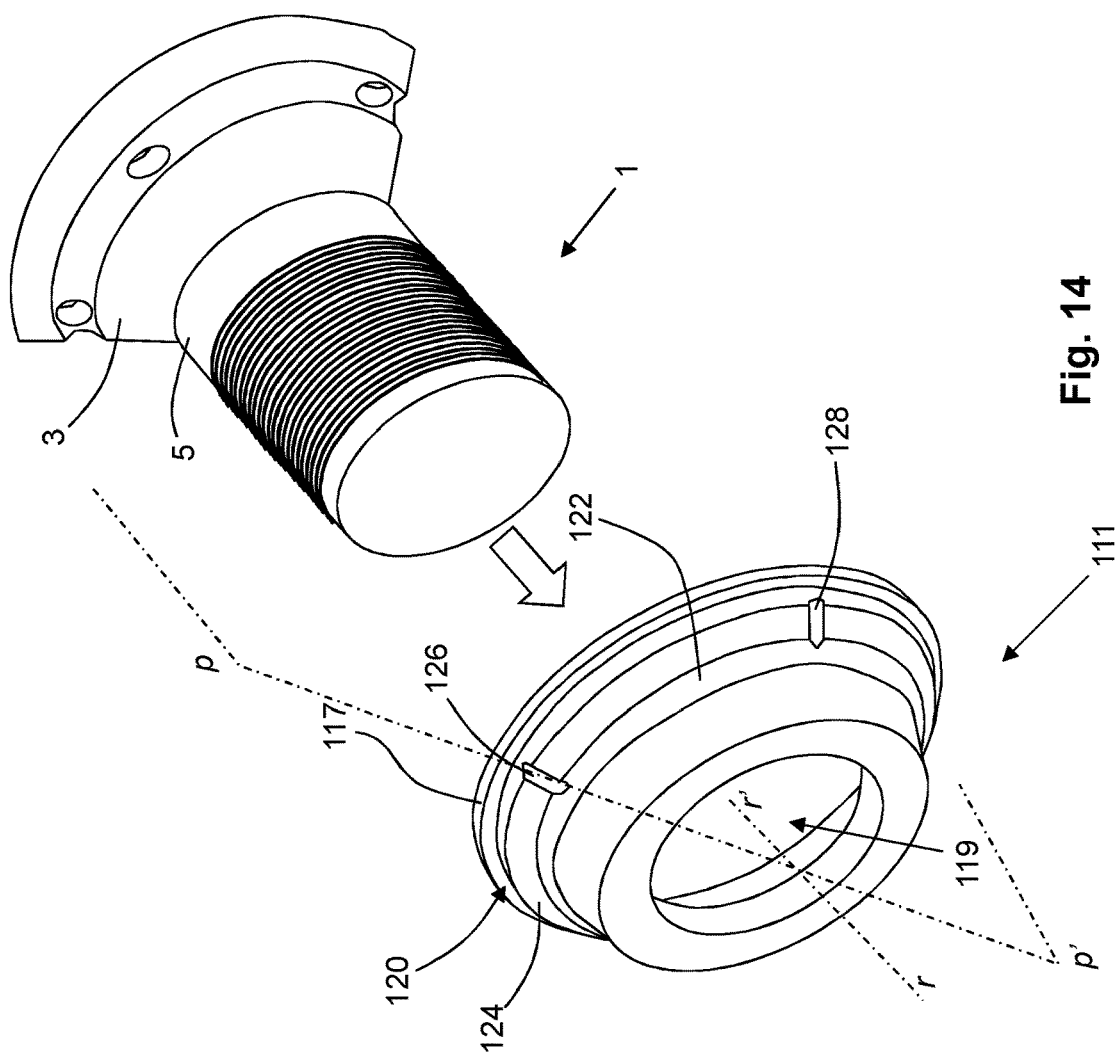
FIG. 14 shows a schematic isometric view of a bolt and different cup washer that are part of another glazing fitting in accordance with the present invention.

FIG. 14 shows an isometric representation of another cup washer 111 useful in a glazing fitting in accordance with the present invention. The bolt 1 in this figure is the same as previously described with reference to FIGS. 1-4.

Figure 15:
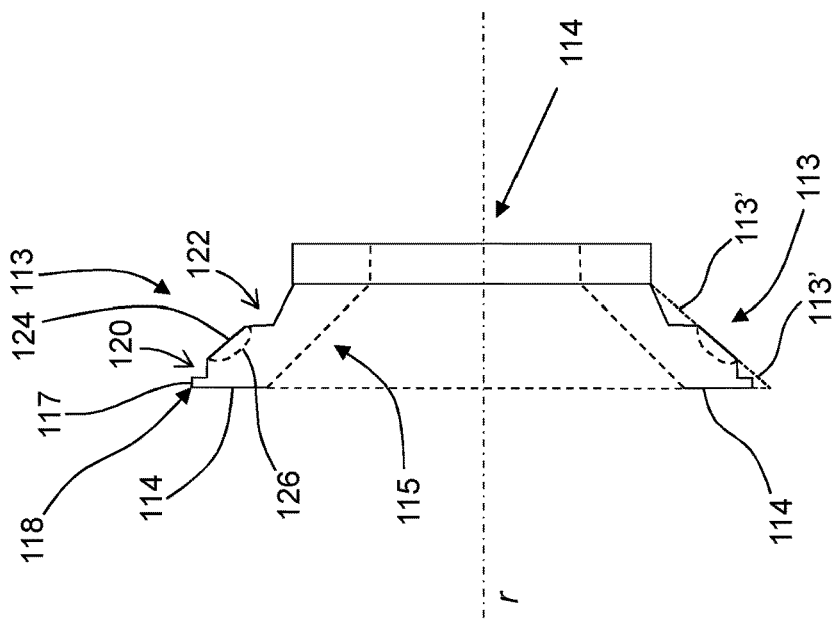
FIG. 15 shows a schematic cross-sectional view of the cup washer shown in FIG. 14.

FIG. 15 shows a cross-sectional representation of the cup washer 111 taken alone the line p-p' of FIG. 14.

In this embodiment the cup washer 111 has a conical internal surface 115 configured for the head portion 3 of the bolt 1 to nest therein (when the bolt 1 is inserted into the cup washer 111 such that the stem 5 passes through opening hole 119). In this respect, the internal surface of the cup washer 111 is configured in the same way as the internal surface of the cup washer 11. However, in contrast to the external surface 13 of the cup washer 11 (which is essentially parallel to the inner surface 15), the external surface 113 of the cup washer 111 is has a step-like structure to provide the external surface of the cup washer 111 with attachment features, as shall be described hereinafter.

With reference to FIGS. 14 and 15, the cup washer 111 has a flat minor surface 114 at one end thereof. The external surface 113 of the cup washer 111 has a first minor surface 117 perpendicular to the minor surface 114. The minor surface 114 intersects with the first minor surface 117 of the external surface to define an outer edge 118 of the cup washer 111. The outer edge 118 of the cup washer 111 is circular in this example.

The external surface 113 of the cup washer 111 is configured with a first recess 120 and a second recess 122. Between the first and second recesses 120, 122, the external surface 113 is configured with a contact portion 124 to contact the wall of the hole into which the cup washer is to be inserted so that the cup washer nests in said hole. With reference to FIG. 6, this is wall 33 of the countersunk hole 32.

The contact portion 124 comprises a plurality of narrow grooves, two of which are shown as 126, 128 in FIG. 14. The grooves 126, 128 each provide a pathway between the first and second recesses 120, 122 as shall be described in more detail hereinafter. The contact portion 124 has four such grooves equally spaced around the contact surface.

The external surface 113 of the cup washer 111 may be produced by milling a conventional cup washer of the type shown in FIG. 1 to provide the external surface with the first minor surface 117, the first and second recesses 120, 122 and the grooves 126, 128. In FIG. 15 the shape of the external surface of the cup washer prior to milling is shown in phantom (labelled as 113') only in the lower region thereof for clarity.

The first and second recesses 120, 122 extend in a ring around the external surface 113 of the cup washer 111. The first and second recesses 120, 122 provide the external surface with a step-like profile and may include undercut portions.

The cup washer 111 is essentially symmetrical about the axis r-r'.

Figure 17:
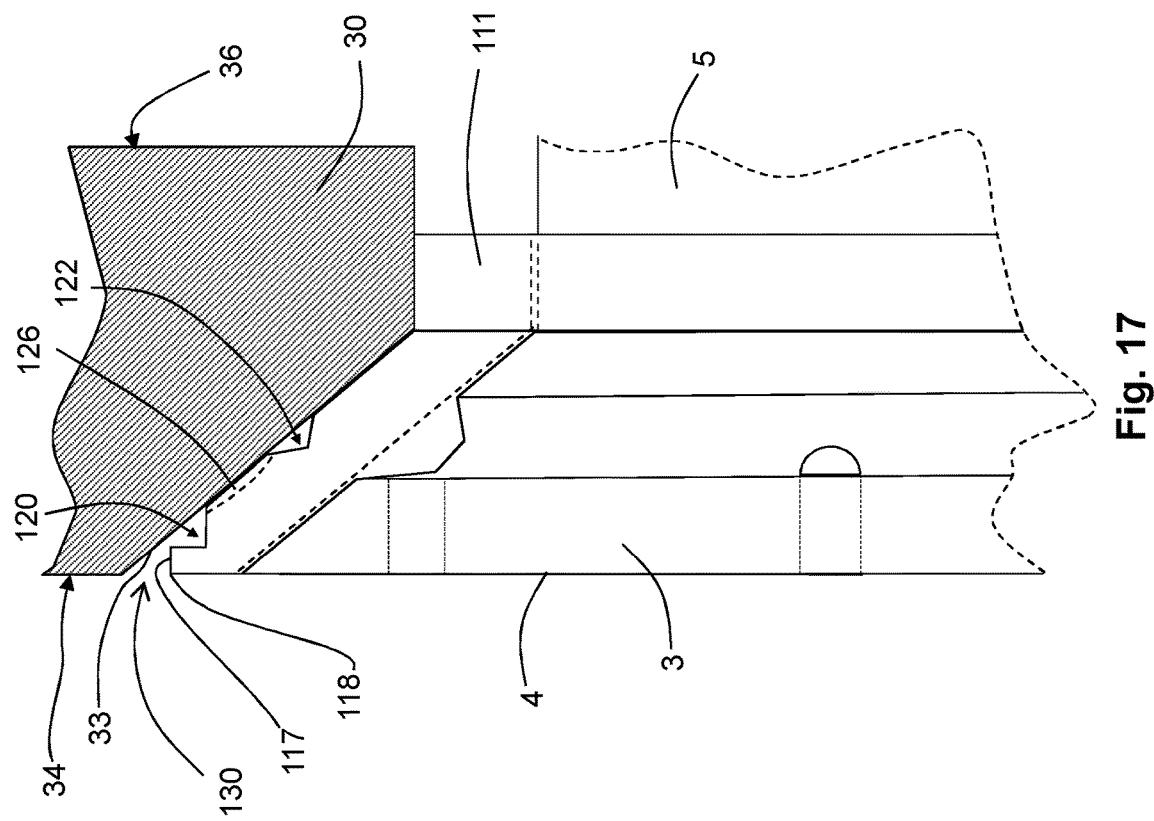
FIG. 17 is a schematic cross-sectional view of a portion of the countersunk head of the bolt in the cup washer of FIG. 14, the cup washer being nested in a countersunk hole in a sheet of glass.
Figure 16:
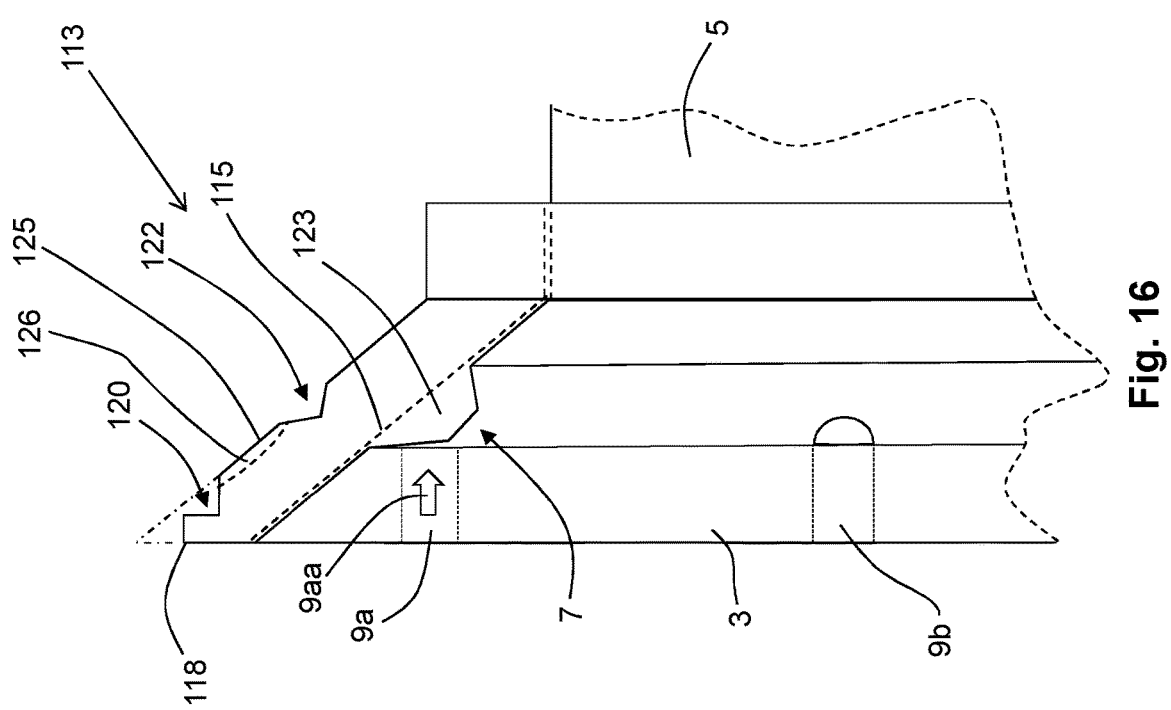
FIG. 16 is a schematic cross-sectional view of a portion of the countersunk head of the bolt in the cup washer of FIG. 14.

FIG. 16 shows the cup washer 111 nested with the head portion 3 of the bolt 1 taken through the line p-p' of FIG. 14. FIG. 17 shows how the cup washer 111 nests in a counter sunk hole in a sheet of glass (i.e. as shown in the first sheet of glass 30 of FIG. 6).

As discussed above, the internal surface 115 of the cup washer 111 is configured the same as the internal surface 15 of the cup washer 11. Given that the bolt 1 used in this example is configured as previously described, the internal surface 115 of the cup washer 111 forms a cavity 123 in the same way as the cavity 23. However, the external surface 113 of the cup washer 111 is configured with additional attachment features.

As illustrated in FIG. 17, the cup washer 111 is shown located in a countersunk hole in a first sheet of glass 30. The outer edge 118 of the cup washer and the minor surface 117 are spaced apart from the first opening of the countersunk hole in the first major surface 34 of the first sheet of glass 30 by a space 130. The space 130 provides a path from the sheet of ionomer 40 to the first recess 120. With the contact surface 124 in contact with the wall of the hole in the first sheet of glass 30, the groove 126 provides a path between the first recess 120 and the second recess 122 so that some ionomer material from the sheet of ionomer material can flow from the first recess 120 into the second recess 122. That is, the first recess 120 is in fluid communication with the second recess by a path formed between the groove 126 and part of the wall 33 of the countersunk hole.

The external surface of the cup washer may have more recesses with associated grooves as desired.

FIG. 18 is similar to FIG. 9 and shows the unlaminated stack of components prior to a suitable lamination process. The bolt 1 is shown clamped to the first sheet of glass 30 by the inner flange 63 being screwed onto the threaded portion 5 of the bolt 1 (with washer 62 used to avoid direct contact of the inner flange 63 with the first sheet of glass 30).

As can be seen in FIG. 18, with the contact surface portion 124 of the external surface of the cup washer in contact with the wall of the hole, the groove 126 in the surface thereof provides a pathway between the first recess 120 and the second recess 122. As in the previous example, the channels 9a, 9b, 9c and 9d face the sheet of ionomer polymer 40 and are empty (other than containing the surrounding atmosphere). The first and second recesses 120, 122, the cavity 123 and the grooves (only 126 is labelled in FIG. 18) are also empty other than containing the surrounding atmosphere. The space between the wall of the hole, the washer 62, the external surface of the cup washer and the stem portion is also empty, other than containing the surrounding atmosphere.

Following a suitable lamination process as shown in FIG. 19, some of the ionomer material from the sheet of ionomer material 40 has flowed through the space 130 between the outer edge 118 and minor surface 114 of the cup washer 111 and the wall of the hole in the first sheet of glass 30 into the first recess 120. It is preferred that the entire first recess 120 be filled with ionomer material from the sheet of ionomer material 40. Due to the grooves 126, 128 (plus others as desired, there being four equally spaced grooves in this example) in the contact surface 124 of the external surface of the cup washer 111, some of the ionomer material from the sheet of ionomer material 40 has also flowed into the second recess region 122. Again, it is preferred that the entire second recess 122 contain some of the ionomer material from the sheet of ionomer material 40. It is also preferred that the grooves be completely filled with ionomer polymer from the sheet of ionomer material 40.

In FIG. 19, ionomer material in the first recess 120 is labelled as 120'. Ionomer material in the groove 126 (pathway between the first and second recesses 120, 122) is labelled as 126' Ionomer material in the second recess 122 is labelled as 122'.

As in the previous example, the channels 9a, 9b, 9c provide a pathway for some of the ionomer material to flow through the head portion into the cavity 123 between the groove in the second surface of the head portion and the internal wall 115 of the cup washer 111.

Following the lamination process, the cup washer 111 and the bolt 1 are attached to the sheet of ionomer material 40. The additional attachment features associated with the external surface of the cup washer increase the degree of attachment to the sheet of ionomer material. The head portion of the bolt and the cup washer are encapsulated by some of the ionomer material from the sheet of ionomer material 40.

Although not exemplified, it is also within the scope of the present invention to have no washer between the head portion and the wall of the hole in the sheet of glazing material. In such embodiments, the second surface of the head portion may be provided with additional attachment features in a similar way as shown for the external surface 113 of the cup washer 111.

Similarly, although the bolts used in the examples of the present invention utilise one or more channels between the first and second surfaces of the head portion, it is within the scope of the present invention for the head portion of the bolt to have no channels therethrough. In such embodiments, the attachment feature is provided by the second surface of the head portion, and/or when present, the external surface of the washer.

The present invention provides an advantage that in the event of breakage of the sheet of glazing material having the hole therein, the potential for the other sheet of glazing material to fall away from the laminated glazing panel (with the sheet of adhesive interlayer material) may be avoided because the sheet of adhesive interlayer material is attached to the glazing fitting, and the glazing fitting is used to secure the laminated glazing panel to a support structure.

The invention claimed is:

1. A laminated glazing panel comprising:
   a first sheet of glazing material joined to a second sheet of glazing material by an interlayer structure comprising at least a first sheet of adhesive interlayer material;
   the first sheet of glazing material having a first major surface and an opposing second major surface;
   the laminated glazing panel being arranged such that the first major surface of the first sheet of glazing material faces the interlayer structure; there being a hole in the first sheet of glazing material, the hole having a wall between the first and second major surfaces of the first sheet of glazing material and being inboard of a peripheral edge of the first sheet of glazing material;
   the laminated glazing panel further comprising a glazing fitting secured thereto, the glazing fitting comprising: a head portion and an attachment feature, the head portion having a first surface and an opposing second surface and being positioned in the hole in the first sheet of glazing material such that the first surface of the head portion faces the first sheet of adhesive interlayer material;
   wherein some of the first sheet of adhesive interlayer material is in the hole in the first sheet of glazing material and is operatively associated with the first attachment feature thereby attaching the glazing fitting to the first sheet of adhesive interlayer material; and
   wherein the head portion has at least a first channel extending between the first and second surfaces thereof, the first channel having a first end and a second end, the first channel communicating with an entrance hole in the first surface of the head portion at the first end, and with an exit hole in the second surface of the head portion at the second end, and wherein some of the first sheet of adhesive interlayer material is in the first channel.

2. The laminated glazing panel according to claim 1, wherein the first channel is configured such that between the first and second ends thereof some of the first sheet of adhesive interlayer material operatively communicates with the first channel to attach the glazing fitting to the first sheet of adhesive interlayer material.

3. The laminated glazing panel according to claim 1, wherein some of the first sheet of adhesive interlayer material extends through the exit hole in the second surface of the head portion.

4. The laminated glazing panel according to claim 1, wherein the second surface of the head portion comprises a groove portion in communication with the exit hole of the first channel and wherein some of the first sheet of adhesive interlayer material is in the groove portion and operatively associated therewith to attach the glazing fitting to the first sheet of adhesive interlayer material.

5. The laminated glazing panel according to claim 1, wherein the head portion is configured such that at least part of the head portion is spaced apart from the wall of the hole by a first space, and the second surface of the head portion is configured to provide at least one attachment feature, wherein some of the first sheet of adhesive interlayer material is in the first space between the wall of the hole and the head portion and some of the first sheet of adhesive interlayer material is operatively associated with the at least one attachment feature of the second surface of the head portion.

6. The laminated glazing panel according to claim 5, wherein the at least one attachment feature of the second surface of the head portion comprises at least a first recess in the second surface of the head portion and some of the first sheet of adhesive interlayer material is in at least a portion of the first recess in the second surface of the head portion.

7. A laminated glazing panel comprising:
   a first sheet of glazing material joined to a second sheet of glazing material by an interlayer structure comprising at least a first sheet of adhesive interlayer material;
   the first sheet of glazing material having a first major surface and an opposing second major surface;
   the laminated glazing panel being arranged such that the first major surface of the first sheet of glazing material faces the interlayer structure; there being a hole in the first sheet of glazing material, the hole having a wall between the first and second major surfaces of the first sheet of glazing material and being inboard of a peripheral edge of the first sheet of glazing material;
   the laminated glazing panel further comprising a glazing fitting secured thereto, the glazing fitting comprising: a head portion and an attachment feature, the head portion having a first surface and an opposing second surface and being positioned in the hole in the first sheet of glazing material such that the first surface of the head portion faces the first sheet of adhesive interlayer material;

wherein some of the first sheet of adhesive interlayer material is in the hole in the first sheet of glazing material and is operatively associated with the first attachment feature thereby attaching the glazing fitting to the first sheet of adhesive interlayer material;

wherein the glazing fitting further comprises a washer configured to fit in the hole in the first sheet of glazing material and configured such that the head portion nests therein, the washer having an internal surface and an opposing external surface;

the internal surface of the washer facing the second surface of the head portion and the external surface of the washer being configured to contact at least a portion of the wall of the hole, the external surface of the washer also being configured to provide at least one attachment feature;

wherein the external surface of the washer is spaced apart from the wall of the hole in the first sheet of glazing material by at least a first space, and wherein some of the first sheet of adhesive interlayer material is in the first space between the wall of the hole and the external surface of the washer;

and wherein some of the first sheet of adhesive interlayer material is operatively associated with the at least one attachment feature of the external surface of the washer.

8. The laminated glazing panel according to claim 7, wherein the attachment feature of the external surface of the washer comprises a first recess in the external surface of the washer.

9. The laminated glazing panel according to claim 8, wherein the attachment feature of the external surface of the washer comprises a second recess in the external surface of the washer spaced apart from the first recess in the external surface of the washer preferably by a portion of the external wall of the washer that is in contact with at least a portion of the wall of the hole and wherein the second recess in the external surface of the washer is in communication with the first recess in the external surface of the washer by at least one pathway in a portion of the external surface of the washer.

10. The laminated glazing panel according to claim 1, wherein the glazing fitting also comprises a washer configured to fit in the hole and configured for the head portion to nest therein, the washer having an internal surface and an opposing external surface, the internal surface of the washer facing the second surface of the head portion, at least one of the second surface of the head portion and the internal surface of the washer being configured to define a cavity between the internal surface of the washer and the second surface of the head portion for containing some of the first sheet of adhesive interlayer material from the exit hole, the cavity being in communication with the exit hole of the first channel.

11. The laminated glazing panel according to claim 10, wherein the second surface of the head portion comprises a groove portion in communication with the exit hole, and wherein the cavity is formed between the groove portion and the internal surface of the washer; or wherein the internal surface of the washer comprises a groove portion opposite the exit hole, and wherein the cavity is formed between the groove portion in the internal surface of the washer and the second surface of the head portion.

12. The laminated glazing panel according to claim 10, wherein some of the first sheet of adhesive interlayer material is in the cavity and operatively associated therewith to attach the glazing fitting to the first sheet of glazing material; or wherein the external surface of the washer is configured to contact at least a portion of the wall of the hole, the external surface of the washer also being configured to provide at least one attachment feature; wherein the external surface of the washer is spaced apart from the wall of the hole in the first sheet of glazing material by at least a first space, and wherein some of the first sheet of adhesive interlayer material is in the first space between the wall of the hole and the external surface of the washer and some of the first sheet of adhesive interlayer material is operatively associated with the at least one attachment feature of the external surface of the washer.

13. The laminated glazing panel according to claim 1, wherein the glazing fitting comprises a stem portion extending away from the head portion, and wherein a mechanical fastener is attached to the stem portion and the glazing fitting is clamped to the first sheet of glazing material between the mechanical fastener and the head portion.

14. The laminated glazing panel according to claim 1, wherein the first sheet of adhesive interlayer material comprises an ionomer polymer, polyvinyl butyral (PVB), acoustic modified PVB, a copolymer of ethylene, ethylene vinyl acetate (EVA), polyurethane (PU), polycarbonate, poly vinyl chloride (PVC) or a copolymer of ethylene and methacrylic acid.

15. The laminated glazing panel according to claim 1, wherein the head portion of the glazing fitting comprises a countersunk portion.

16. A glazing fitting for a laminated glazing panel, the laminated glazing panel comprising first and second sheets of glazing material joined together by at least a first sheet of adhesive interlayer material, the glazing fitting being configured for securing to a hole in the first sheet of glazing material, the hole extending between opposing major surfaces of the first sheet of glazing material; the glazing fitting comprising: a head portion having a first surface for facing the first sheet of adhesive interlayer material and an opposing second surface; and an attachment feature for operatively associating with some of the first sheet of adhesive interlayer material during a lamination process for making the laminated glazing panel to attach the glazing fitting to the first sheet of adhesive interlayer material following the lamination process, the glazing fitting further comprising a washer configured to fit in the hole in the first sheet of glazing material and configured for the head portion to nest therein, the washer having an internal surface and an opposing external surface; the internal surface of the washer for facing the second surface of the head portion and the external surface of the washer being configured to contact at least a portion of the wall of the hole in the first sheet of glazing material, and wherein the external surface of the washer is configured to provide at least one attachment feature.

17. The glazing fitting according to claim 16, wherein the attachment feature comprises at least a first channel extending through the head portion communicating at a first end with an entrance hole in the first surface of the head portion and at a second end with an exit hole in the second surface of the head portion and/or wherein the second surface of the head portion is configured to provide at least one attachment feature.

18. A method for making a laminated glazing panel comprising the steps:
(i) providing a first sheet of glazing material having at least a first hole extending between a first and a second major surface thereof;
(ii) providing a glazing fitting according to claim 16;

(iii) positioning the head portion of the glazing fitting in the hole such that the first surface of the head portion faces in the direction of the first major surface of the first sheet of glazing material;
(iv) providing a first sheet of adhesive interlayer material;
(v) positioning the first sheet of adhesive interlayer material on the first major surface of the first sheet of glazing material to cover the first surface of the head portion;
(vi) laminating the first sheet of adhesive interlayer material to the first sheet of glazing material using suitable lamination conditions;
wherein during step (vi) the head portion is configured such that some of the first sheet of adhesive interlayer material flows into the hole to operatively associate with the attachment feature to attach the glazing fitting to the first sheet of adhesive interlayer material.

19. A glazing fitting for a laminated glazing panel, the laminated glazing panel comprising first and second sheets of glazing material joined together by at least a first sheet of adhesive interlayer material, the glazing fitting being configured for securing to a hole in the first sheet of glazing material, the hole extending between opposing major surfaces of the first sheet of glazing material; the glazing fitting comprising: a head portion having a first surface for facing the first sheet of adhesive interlayer material and an opposing second surface; and an attachment feature for operatively associating with some of the first sheet of adhesive interlayer material during a lamination process for making the laminated glazing panel to attach the glazing fitting to the first sheet of adhesive interlayer material following the lamination process, wherein the head portion has at least a first channel extending between the first and second surfaces thereof, the first channel having a first end and a second end; the first channel communicating with an entrance hole in the first surface of the head portion at the first end, and with an exit hole in the second surface of the head portion at the second end; the glazing fitting also comprising a washer configured to fit in the hole and configured for the head portion to nest therein, the washer having an internal surface and an opposing external surface, the internal surface of the washer facing the second surface of the head portion, at least one of the second surface of the head portion and the internal surface of the washer being configured to define a cavity between the internal surface of the washer and the second surface of the head portion, the cavity being in communication with the exit hole of the first channel.

20. A method for making a laminated glazing panel comprising the steps:
(i) providing a first sheet of glazing material having at least a first hole extending between a first and a second major surface thereof;
(ii) providing a glazing fitting according to claim 19;
(iii) positioning the washer in the hole;
(iv) positioning the head portion of the glazing fitting in the hole such that the head portion nests in the washer and the first surface of the head portion faces in the direction of the first major surface of the first sheet of glazing material;
(v) providing a first sheet of adhesive interlayer material;
(vi) positioning the first sheet of adhesive interlayer material on the first major surface of the first sheet of glazing material to cover the first surface of the head portion;
(vii) laminating the first sheet of adhesive interlayer material to the first sheet of glazing material using suitable lamination conditions;
wherein during step (vii) the head portion is configured such that some of the first sheet of adhesive interlayer material flows into the hole to operatively associate with the attachment feature to attach the glazing fitting to the first sheet of adhesive interlayer material.

* * * * *